(12) United States Patent
Shirota et al.

(10) Patent No.: US 10,379,746 B2
(45) Date of Patent: Aug. 13, 2019

(54) INFORMATION PROCESSING APPARATUS, STORAGE DEVICE, AND COMPUTER PROGRAM PRODUCT

(71) Applicant: TOSHIBA MEMORY CORPORATION, Minato-ku (JP)

(72) Inventors: Yusuke Shirota, Yokohama (JP); Tatsunori Kanai, Yokohama (JP); Shiyo Yoshimura, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 159 days.

(21) Appl. No.: 15/422,894

(22) Filed: Feb. 2, 2017

(65) Prior Publication Data

US 2017/0228155 A1    Aug. 10, 2017

(30) Foreign Application Priority Data

Feb. 4, 2016 (JP) .................................. 2016-020116

(51) Int. Cl.
*G06F 3/06* (2006.01)
(52) U.S. Cl.
CPC ............ *G06F 3/061* (2013.01); *G06F 3/0655* (2013.01); *G06F 3/0659* (2013.01); *G06F 3/0688* (2013.01)
(58) Field of Classification Search
CPC ...... G06F 3/0659; G06F 3/061; G06F 3/0688; G06F 3/0655; G06F 3/0685
USPC .......................................................... 711/103
See application file for complete search history.

(56) References Cited

U.S. PATENT DOCUMENTS

| 2009/0315903 | A1  | 12/2009 | Ishikawa |  |
|---|---|---|---|---|
| 2015/0378882 | A1* | 12/2015 | Rosner | G06F 12/023 711/148 |
| 2016/0335181 | A1* | 11/2016 | Wang | G06F 3/0638 |
| 2016/0378655 | A1* | 12/2016 | Blagodurov | G06F 12/0811 711/122 |

FOREIGN PATENT DOCUMENTS

JP          2010-3076          1/2010

* cited by examiner

*Primary Examiner* — Hashem Farrokh
(74) *Attorney, Agent, or Firm* — Oblon, McClelland, Maier & Neustadt, L.L.P.

(57) ABSTRACT

According to an embodiment, an information processing apparatus includes a processing device, a first memory, and a second memory. The processing device executes first processing on first data. The second memory stores the first data and has a data access latency higher than that of the first memory. The first data includes first and second pages, the first page being read/written times not less than a threshold in a certain period shorter than a period for executing the first processing, the second page being read/written times less than the threshold in the certain period. The processing device includes a controller configured to execute first access to move the first page to the first memory and then read/write data from/to the moved first page, and execute second access to directly read/write data from/to the second page of the second memory.

18 Claims, 14 Drawing Sheets

FIG.2
(A)
NUMBER OF PIECES OF PAGE DATA USED = 3/64
 ⇒ SECOND PAGE
(B)
NUMBER OF PIECES OF PAGE DATA USED = 64/64
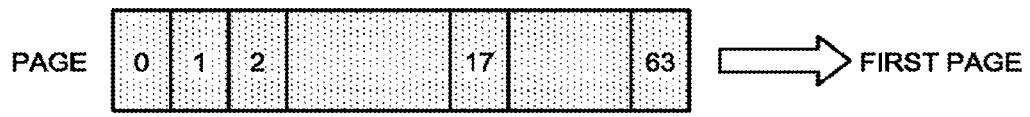 ⇒ FIRST PAGE FIG.3
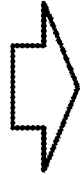
(C)
NUMBER OF PIECES OF PAGE DATA USED = 1/64
ACCESSED 64 TIMES
TOTAL NUMBER OF PIECES OF PAGE DATA USED = 64
PAGE ⇒ FIRST PAGE
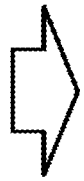
(B)
NUMBER OF PIECES OF PAGE DATA USED = 1/64
ACCESSED ONCE
TOTAL NUMBER OF PIECES OF PAGE DATA USED = 1
PAGE ⇒ SECOND PAGE
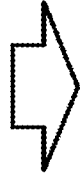
(A)
NUMBER OF PIECES OF PAGE DATA USED = 64/64
EACH ACCESSED ONCE
TOTAL NUMBER OF PIECES OF PAGE DATA USED = 64
PAGE ⇒ FIRST PAGE

# INFORMATION PROCESSING APPARATUS, STORAGE DEVICE, AND COMPUTER PROGRAM PRODUCT

CROSS-REFERENCE TO RELATED APPLICATION

This application is based upon and claims the benefit of priority from Japanese Patent Application No. 2016-020116, filed on Feb. 4, 2016; the entire contents of which are incorporated herein by reference.

FIELD

Embodiments described herein relate generally to an information processing apparatus, a storage device, and a computer program product.

BACKGROUND

Techniques are conventionally known in which data that is too large to be fully loaded in a main memory, such as a dynamic random access memory (DRAM), is stored in an area (called a swap area in some cases) allocated in a storage (such as a hard disk drive (HDD) or a solid state drive (SDD)) separate from the main memory, and an application is run while execution of swap processing (data movement processing) that includes processing (page-out) to move a page (unit of data to be read or written) from the main memory to the swap area and processing (page-in) to move the page from the swap area to the main memory.

In the conventional techniques, however, when only several bytes of a page of, for example, 4 KB paged into the main memory is used, a large portion of time (overhead) and power required for the page-in is wasted. This makes it difficult to increase the efficiency of the processing.

BRIEF DESCRIPTION OF THE DRAWINGS

FIG. 2 is a diagram for explaining a first page and a second page of the first embodiment;

FIG. 3 is a diagram for explaining the first page and the second page of the first embodiment;

DETAILED DESCRIPTION

Figure 1:
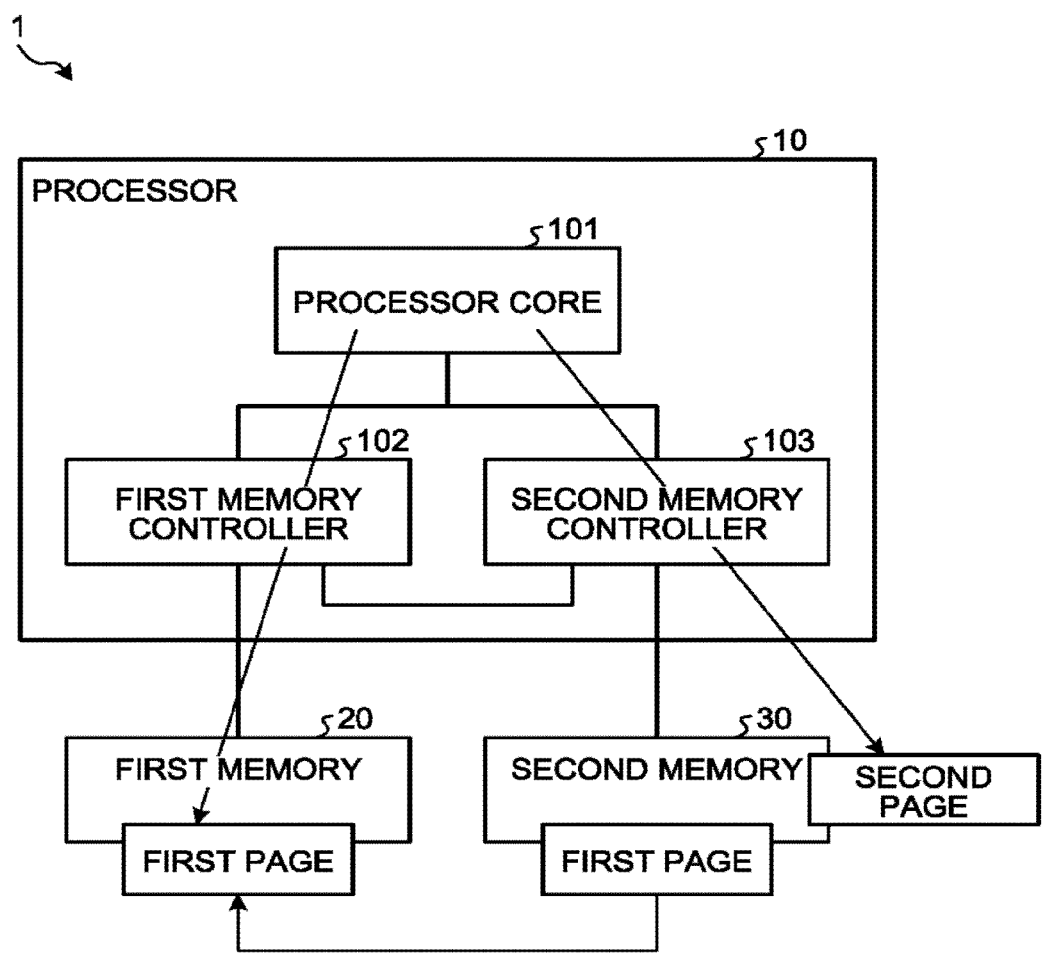
FIG. 1 is a diagram illustrating an exemplary configuration of an information processing apparatus according to a first embodiment.

According to an embodiment, an information processing apparatus includes a processing device, a first memory, and a second memory. The processing device is configured to execute first processing to process first data. The second memory is configured to store the first data, the second memory having an access latency of reading and writing of data higher than that of the first memory. The first data includes a first page and a second page, the first page being read or written a number of times equal to or more than a threshold in a certain period that is shorter than a processing period for executing the first processing, the second page being read or written a number of times less than the threshold in the certain period. The processing device includes an access controller configured to execute first access of performing movement processing to move the first page to the first memory and then reading or writing data from or to the first page moved to the first memory, and execute second access of directly reading or writing data from or to the second page of the second memory.

The following describes in detail embodiments of an information processing apparatus, a storage device, and a computer program product according to the present invention with reference to the accompanying drawings.

First Embodiment

Before description of specific details, an overview of a first embodiment will be described together with conventional techniques. A computer system needs to provide a large-capacity memory space (address space) for an application that performs large-scale data processing. A virtual address space having a larger size than that of a main memory (such as a DRAM) can be provided for the application (process) by using swap processing using a virtual memory system of an operating system (OS), such as Linux (registered trademark), and thus, the OS can run the application that needs a memory (area in which data is stored) having a size not contained in the main memory (physical memory) constituted by the DRAM.

The virtual memory system of the OS maps (allocates) virtual addresses specified by the application to physical addresses (information indicating memory locations). The mapping is performed using a page table that stores a correspondence relation on a basis of per page managed by the OS (hereinafter, simply called "page"). In the swap processing provided by a swapping mechanism of the virtual memory system, pages not mapped to the main memory (pages not present in the DRAM) are stored in an area (swap area) allocated in a storage, such as a hard disk drive (HDD)

or a solid state drive (SSD), different from the main memory. The application is run while execution of the swap processing described above. In this manner, the swap processing is used by using a device, such as the HDD or the SSD, as a swap device that is a device with the swap area allocated therein, and thereby, a large and fast main memory can appear to be present as an area in which the data to be processed by the application is stored (as a working area for the processing) together with the main memory constituted by the DRAM.

However, the storage device, such as the SSD or the HDD, has a high access latency of reading and writing of data (a low access speed of data reading and writing). Hence, in the case of using such a storage device as the swap device, when the swap processing described above (processing to transfer the data from the swap device to the main memory or to transfer the data from the main memory to the swap device) occurs, a problem occurs that the speed performance of the application is greatly reduced by the data transfer between the main memory and the SSD or between the main memory and the HDD. To solve this problem, it has been considered to prevent the performance deterioration by reducing useless data transfer between the main memory and the swap device. In addition, the occurrence of the swap processing destabilizes (reduces the predictability of) the speed performance of the application. Hence, the system is generally designed so as to allocate a sufficient size of the main memory to prevent the occurrence of the swap processing as much as possible.

The data transfer for the swap processing can be performed at a high speed by using, as the swap device, a large-capacity, high-speed nonvolatile memory (hereinafter, called "NVM"), which is described in Japanese Patent Application Laid-open Publication No. 2010-003076 and is also called a storage-class memory (SCM), that has an access latency equal to or slightly larger than that of the DRAM (main memory) (the present invention includes all types of memories having various characteristics, such as a memory that has a read latency and a write latency both larger than those of the DRAM and has a larger write latency than the read latency, or a memory that has a read latency equal to that of the DRAM and a slower write latency than that of the DRAM), the NVM being slower in speed than the DRAM, but faster than the storages, such as the SSD and the HDD, and being larger in capacity than the DRAM. Hence, the speed performance of the application is not sharply reduced even if the swap processing is performed with a certain degree of activeness.

Although the overhead of the data transfer is reduced by using the NVM, an overhead of memory access with low locality arises, such as access to a plurality of pieces of data (a plurality of pieces of discretely arranged data) arranged in small units on different pages that occurs in applications for, for example, large-scale graph analysis and database manipulation. In such memory access, when only several bytes of a page of, for example, 4 KB paged into the main memory is used, a large portion of time (overhead) and power required for the page-in of the 4 KB page is wasted. In such a case, taking advantage of a characteristic of the NVM that the NVM is accessible (addressable) in smaller units than that of the OS (for example, on a per byte basis or on a processor's cache line size basis) unlike the conventional SSD and HDD, the NVM that is slightly slower than the main memory but is accessible in smaller units than that of page, such as on a per byte basis, can be directly accessed so as to perform the processing faster and with less power consumption, in some times. Hence, it is an object of the present embodiment to perform the processing faster and with less power consumption by using either of (mixing) the direct access (second access to be described later) and the access through the conventional swap processing (first access to be described later).

The following describes the specific details of the present embodiment. FIG. 1 is a diagram illustrating an exemplary hardware configuration of an information processing apparatus 1 of the present embodiment. As illustrated in FIG. 1, the information processing apparatus 1 includes a processor 10, a first memory 20, and a second memory 30.

The processor 10 is an example of a "processing device", and is a device for executing various types of processing. In this example, the processor 10 is a processor, such as an Intel Xeon processor, and includes a plurality of processor cores 101 (FIG. 1 illustrates only one of the processor cores 101, for convenience of description). Each of the processor cores 101 includes private caches, such as an L1 data cache, an L1 instruction cache, and an L2 cache (not illustrated). The processor cores 101 also include a last level cache (LLC), such as an L3 cache, serving as a cache located at the lowest level of the cache hierarchy, as a shared cache shared among the processor cores 101. The following description assumes such a configuration. The processor 10 is, however, not limited to this configuration, but may be configured as a single processor system.

The processor 10 includes a first memory controller 102 (DRAM controller, in this example), through which the first memory 20 (DRAM, in this example) is connected (memory bus connection) to the processor 10. The processor 10 also includes a second memory controller 103 (NVM controller, in this example), through which the second memory 30 (NVM, in this example) is connected (memory bus connection) to the processor 10. The second memory 30 is not limited to this example, but may be connected to the processor 10 with any connection method, and may be mounted in any form. The example of FIG. 1 illustrates the two memory controllers (first and second memory controllers 102 and 103). The memory controllers are, however, not limited to this example, but may be configured as one hybrid memory controller to which the first and second memories 20 and 30 are connectable.

The processor 10 (processor cores 101) executes software (programs), such as the application and the operating system (OS) so as to perform various functions. The OS is a basic program for providing functions for controlling hardware resources included in the information processing apparatus 1. The OS is, for example, Linux. The application is a program for providing a specific function by using the OS, and may be of any type. The present embodiment assumes a case where any application (process, which is called "first processing" in some cases, for convenience of description) that operates on the processor 10 processes data (called "first data" in some cases) in the second memory 30. In this case, the processor 10 (processor cores 101) can be considered to execute the first processing to process the first data. In this example, the first data is constituted by a plurality of pages each representing data having a constant size (size as a unit of management by the OS). Here, the OS receives a request for access to (a read request or a write request of) data (processing target data included in the first data) to be processed by the application, from the application, and performs control according to the received access request. The specific functions included in the OS of the present embodiment will be described later.

The first memory 20 is a memory used for reading and writing data by the processor 10, and is constituted by the DRAM in this example. The first memory 20 serves as the main memory. The processor 10 directly reads and writes data from and to the first memory 20. The first memory 20 may be a high-speed nonvolatile memory, such as a magnetoresistive random access memory (MRAM), for the main memory.

The second memory 30 is constituted by the large-capacity, high-speed nonvolatile memory (NVM) connected to the processor 10. In general, although the NVM has an access latency of reading and writing of data roughly equal to or slightly higher than that of the DRAM, the NVM has a larger capacity than that of the DRAM (may have a roughly equal capacity to that of the DRAM), and is nonvolatile, so that the NVM is a memory that consumes no or very low standby power. The NVM included in the second memory 30 may be configured as an MRAM, or may be configured as, for example, a phase change memory (PCM), a 3D XPoint, a resistive random access memory (ReRAM), a ferroelectric random access memory (FeRAM), or a memristor, but is not limited to these memories. The second memory 30 is assumed to be a memory that has an access latency of 10 nanoseconds to several microseconds, and consumes lower power than that of the first memory 20 to keep data (is typically a nonvolatile memory, but is not limited to this, and may be a volatile memory consuming very lower power to keep data). For example, the access latency of the second memory 30 may be faster or slower than the range from 10 nanoseconds to several microseconds. Here, the second memory 30 is assumed to be a (byte addressable) memory that is accessible in smaller units than that of, for example, the page size of the OS (on a per byte basis (in a byte addressable manner) or on a processor's cache line size basis), and to be a memory directly accessible from the processor 10. The second memory 30 has an access latency of reading and writing of data higher than that of the first memory 20, and stores the first data described above. In other words, the second memory 30 has an access speed of data reading and writing lower than that of the first memory 20. The second memory 30 may be, for example, a large-capacity, low-power consumption memory.

The second memory 30 (a part or whole of the second memory 30) is used as the swap device (device in which the swap area is allocated) that is used in the swap processing using the virtual memory system of the operating system (OS), such as Linux, operating on the processor 10. Consequently, when target data representing the data requested to be accessed (to be read or written) is present in the second memory 30, a page (data having a size serving as a unit of the swap processing) in the first memory 20 is transferred to the second memory 30 by the swap processing using the virtual memory system of the OS operating on the processor 10 if the first memory 20 has no or little free area, a page including the target data in the second memory 30 is transferred to the first memory 20, and then, the reading or writing is performed from or to the page transferred from the second memory 30. The transfer from the first memory 20 to the second memory 30 and the transfer from the second memory 30 to the first memory 20 described above may be performed in any order and at any timing. For example, so as to allow the page including the target data in the second memory 30 to be transferred to the first memory 20 as soon as the page is required, the first memory 20 may be implemented to be freed at any time before the page is required, by collectively transferring a plurality of pages in the first memory 20 that have not been recently used to the second memory 30. This also applies to the description below. The data transfer between the first and second memories 20 and 30 may be performed by any of the processor cores 101, or by hardware dedicated to data transfer (direct memory access (DMA) controller) (not illustrated). This applies to other examples as well.

In the present embodiment, when the reading or writing of the page from or to the second memory 30 is requested from the application, the processor 10 switches whether to execute the first access of performing the swap processing (movement processing) to move the page to the first memory 20 according to the access characteristic (characteristic indicating how to be accessed) of the page, and then reading or writing the page moved to the first memory 20, or to execute the second access of directly reading or writing the data from or to the second memory 30.

More specifically, the following is performed. Here, the first data includes a first page (a page with a high use frequency, or a page with high access locality) and a second page (a page with a low use frequency, or a page with low access locality), the first page being read or written a number of times equal to or more than a threshold in a certain period that is shorter than a processing period for executing the first processing, the second page being read or written a number of times less than the threshold in the certain period. The "processing period for executing the first processing" may be considered to be a period during which the first processing is executed (the application is operating), or may be considered to be a period from when a trigger for executing the first processing occurs until the first processing ends.

The threshold mentioned above is any value, and can be set, for example, to 1/x (x may be set to any value) of the number of a plurality of pieces of data included in one page. In the description below, each of the plurality of pieces of data included in one page is called "page data". The respective pieces of page data may the same in structure and/or in size, or some or all thereof may differ in structure and/or in size.

Assume, for example, a case where one page is constituted by 64 pieces of page data, and the threshold mentioned above is set to "4", as illustrated in FIG. 2. As illustrated in (A) of FIG. 2, if the number of pieces of the page data used in the certain period is three, the number is smaller than the threshold, so that the use frequency (access frequency) of the page is regarded as low, and the page is regarded as the second page. As illustrated in (B) of FIG. 2, if the number of pieces of the page data used in the certain period is 64, the number is larger than the threshold, so that the use frequency (access frequency) of the page is regarded as high, and the page is regarded as the first page.

Assume also, for example, a case where all pieces of the page data in one page are used, once for each piece, in the certain period, as illustrated in (A) of FIG. 3. In this case, the number of pieces of the page data used in the certain period is 64, which is larger than the threshold mentioned above, so that the page is regarded as the first page. Assume also, for example, a case where only one piece of the page data in one page is used only once in the certain period, as illustrated in (B) of FIG. 3. In this case, the number of pieces of the page data used in the certain period is one, which is smaller than the threshold mentioned above, so that the page is regarded as the second page. Assume further, for example, a case where only one piece of the page data in one page is used 64 times in the certain period, as illustrated in (C) of FIG. 3. In this case, the number of pieces of the page data used in the certain period is determined to be 64, which is larger than the threshold mentioned above, so that the page is regarded as the first page. In the example of (C) in FIG. 3, although only one piece of the page data is used in the certain period among the 64 pieces of the page data included in one page, the times of use of the piece of page data is larger than the threshold mentioned above, so that the use frequency of the page is determined to be high.

The processor 10 executes first access of performing movement processing to move the first page to the first memory and then reading or writing data from or to the first page moved to the first memory, and executes second access of directly reading or writing data from or to the second page of the second memory. More specifically, when a page to be read from or written to among the pages included in the first data (data in the second memory 30 to be processed by the application) described above is the first page, the processor 10 executes the first access of performing the swap processing (movement processing) to move the page to the first memory 20, and then reading or writing the page moved to the first memory 20. When the page to be read from or written to is the second page, the processor 10 executes the second access of directly reading or writing the data from or to the second memory 30. More in detail, the processor 10 has the following function: when the page among the pages included in the first data that corresponds to the target data representing the page data requested to be read or written by the application is the first page, the processor 10 executes the first access of performing the swap processing to move the page to the first memory 20, and then reading or writing the target data moved to the first memory 20, or when the page corresponding to the target data is the second page, the processor 10 executes the second access of directly reading or writing the target data from or to the second memory 30.

Figure 4:
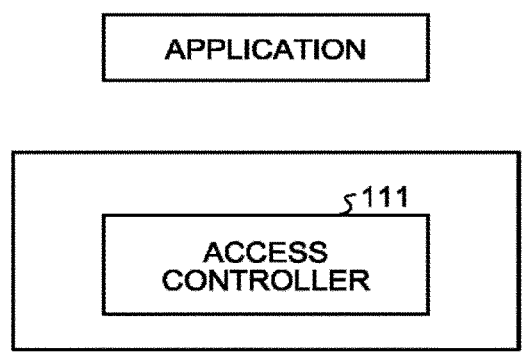
FIG. 4 is a diagram illustrating software included in the information processing apparatus of the first embodiment.

The following describes the functions provided by the OS operating on the processor 10. FIG. 4 is a diagram illustrating an exemplary configuration of the software included in the information processing apparatus 1. The software (programs) executed by the processor 10 includes the application and the OS. As illustrated in FIG. 4, the OS includes an access controller 111. In this example, only functions related to the present embodiment are exemplified and described. The functions included in the OS are, however, not limited to those described below.

The access controller 111 executes the first access when the page to be read from or written to among the pages included in the first data is the first page. The access controller 111 executes the second access when the page to be read from or written to is the second page.

When the page is transferred to the first memory 20 by the swap processing, the page can be quickly accessed because the first memory 20 (main memory) has a low access latency of reading and writing of data. However, in the case where a page with low access locality (page that is used a number of times less than the threshold in the certain period described above) such as that described above is transferred to the first memory 20, and then the page transferred to the first memory 20 is read or written, if the times of access to (the number of times of use of) the page is less than the threshold, a large portion of time and power required for the swap processing of the page is wasted. In addition, a certain page is moved out of the first memory 20 into the second memory 30 in order to transfer the page with low access locality from the second memory 30 to the first memory 20. As a result, the first memory 20 cannot be efficiently used, and the amount of needless data transfer further increases.

Hence, in the present embodiment, when the page to be read from or written to among the pages included in the first data in the second memory 30 is a page with high access locality (first page), the first access is executed to perform the swap processing to move the page to the first memory 20, and then to read or write the page moved to the first memory 20, or when the page to be read from or written to is a page with low access locality (second page), the second access is executed to directly read or write the data from or to the second memory 30. As a result, the time and the power required for the swap processing can be restrained as much as possible from being wasted. This can increase the efficiency of the processing. When the increase in efficiency of the processing reduces the amount of needless data transfer mentioned above, the necessary size of the first memory 20 can be reduced. As a result, the information processing apparatus can be made to have the first memory 20 having a smaller size, or an area that has been reduced (area that is no longer necessary) in the first memory 20 can be dynamically powered off to save power.

From another point of view, the access controller 111 can be considered to perform control so as to increase the ratio of the amount of access to the first memory 20 of the processor 10 relative to the amount of data transfer between the first memory 20 and the second memory 30. That is, it can be considered that, when reading or writing the first data in the second memory 30, the access controller 111 of the present embodiment performs the first access and the second access of directly reading or writing the data from or to the second memory 30 so that the ratio of the amount of reading or writing of data from or to the first memory 20 performed by the processor 10 is larger than the above-described ratio obtained when the whole first data is read or written by execution of the first access, relative to the amount of data transfer between the first memory 20 and the second memory 30 that occurs along with the first access of reading or writing the page moved into the first memory 20 after the execution of the swap processing of moving the page in the second memory 30 to the first memory 20. Also in this case, it can be considered that the pages included in the first data in the second memory 30 include the first page that is read or written a number of times equal to or more than the threshold and the second page that is read or written a number of times less than the threshold in the certain period shorter than the processing period for executing the first processing, and that the access controller 111 performs the first access when the page to be read from or written to is the first page, and performs the second access when the page to be read from or written to is the second page.

To (reduce waste and) efficiently use the first memory 20 serving as the main memory, it is important to increase the ratio of the amount of access to the first memory 20 of the processor 10 relative to the amount of data transfer between the first memory 20 and the second memory 30. In this respect, the present embodiment can increase the ratio of the amount of data access to the first memory 20 of the processor 10 relative to the amount of data transfer between the memories, and thereby can efficiently use the first memory 20.

It can be considered that, when reading or writing the first data in the second memory 30, the access controller 111 of the present embodiment performs the first access and the second access of directly reading or writing the data from or to the second memory 30 so that the sum of the power consumption of the first memory 20 and the power consumption of the second memory 30 is smaller than the power consumption generated when the whole first data in the second memory 30 is read or written by execution of the first access of reading or writing the page moved into the first memory 20 after the execution of the swap processing of moving the page included in the first data in the second memory 30 to the first memory 20. Also in this case, it can be considered that the pages included in the first data in the second memory 30 include the first page that is read or written a number of times equal to or more than the threshold and the second page that is read or written a number of times less than the threshold in the certain period shorter than the processing period for executing the first processing, and that the access controller 111 performs the first access when the page to be read from or written to is the first page, and performs the second access when the page to be read from or written to is the second page.

In the present embodiment, the access controller 111 determines whether the page to be read from or written to is the first page or the second page based on correspondence information that associates each of a plurality of pages with access information indicating whether to perform the first access or the second access to perform reading or writing. In this example, the access controller 111 receives, from the application, hint information that specifies determination information for determining, for each piece of data having a predetermined size (which may be larger or smaller than the page size) included in the data (first data) to be processed by the application, whether to perform the first access or the second access to read or write the piece of data, and sets the correspondence information based on the received hint information. To arrange (map) the data to be processed by the application in the first and second memories 20 and 30, the access controller 111 receives the data and the hint information from the application. The access controller 111 divides the data received from the application into a plurality of pages, and after identifying, based on the hint information, whether to perform the first access or the second access to read or write each of the pages, arranges (maps) the pages in the first memory 20 or the second memory 30. According to the arrangement, the access controller 111 set a page table that represents a correspondence relation between the virtual addresses (virtual addresses allocated to the processing target data) specified by the application and the physical addresses (information indicating the memory locations).

Figure 5:
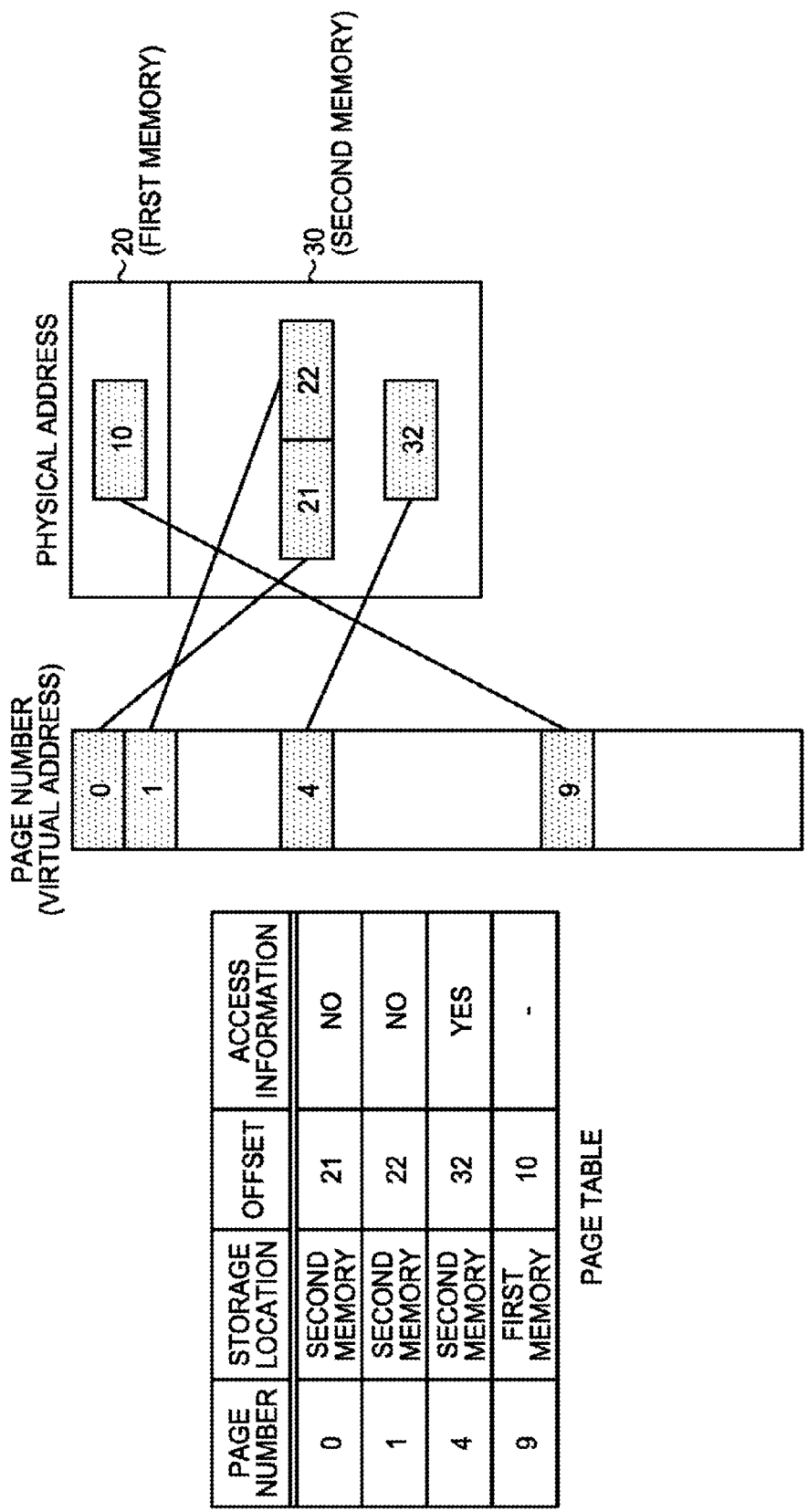
FIG. 5 is a diagram for explaining a page table of the first embodiment.

FIG. 5 is a diagram illustrating an example of the page table of the present embodiment. As illustrated in FIG. 5, the page table is information that associates a page number for identifying a page corresponding to a virtual address with a physical storage location of each page, an offset, and the access information. The offset is information indicating a location (i.e., the physical address) at which the page is mapped. The access information is information indicating whether to perform the first access or the second access to perform reading or writing. In this example, an indication of "Yes" in the access information means that the corresponding page is to be read or written by execution of the second access (i.e., means that the corresponding page is the second page), and an indication of "No" in the access information means that the corresponding page is to be read or written by execution of the first access (i.e., means that the corresponding page is the first page). In this example, the page table corresponds to the correspondence information described above. The correspondence information described above is, however, not limited to this example, but may take any form.

In the example of FIG. 5, assume, for example, a case where the OS that has received a request from the application accesses a page corresponding to a page number indicating "0". In this case, the access information in the page table of FIG. 5 corresponding to the page number indicating "0" indicates "No". As a result, the OS (access controller 111) determines that the page is the first page, and performs the swap processing. Thus, the processor 10 executes the first access. Assume also, for example, a case where the OS that has received a request from the application accesses a page corresponding to a page number indicating "4". In this case, the access information in the page table of FIG. 5 corresponding to the page number indicating "4" indicates "Yes". As a result, the OS (access controller 111) determines that the page is the second page, and does not perform the swap processing. Thus, the processor 10 executes the second access of directly accessing the second memory 30.

Figure 6:
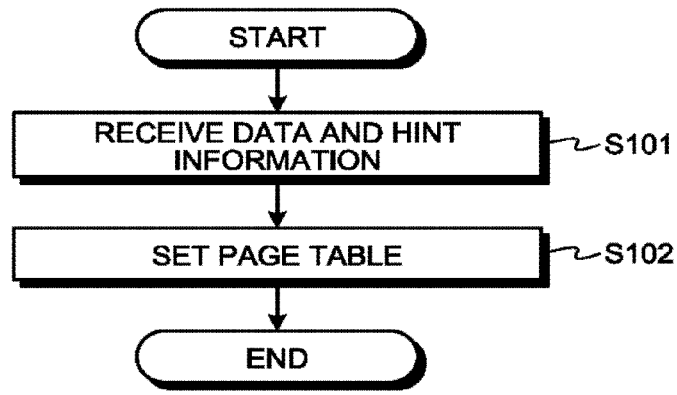
FIG. 6 is a diagram illustrating an operation example of the information processing apparatus of the first embodiment.

FIG. 6 is a flowchart illustrating an operation example of the information processing apparatus 1 (access controller 111) in the case of setting the page table described above. As illustrated in FIG. 6, the access controller 111 receives the data used by the application and the hint information described above from the application (Step S101).

The access controller 111 then divides the data received at Step S101 into a plurality of pages, and based on the hint information received at Step S101, sets the correspondence information that associates the access information described above with each of the divided pages (Step S102). This example assumes a case that the hint information specifies, as the determination information, information directly indicating whether to perform the first access or the second access to read or write each piece of the data having the predetermined size included in the data to be processed by the application. This allows the access controller 111 to immediately identify, by referring to the hint information, whether to perform the first access or the second access to read or write each of the pages, thereby requiring no specific determination.

The OS (information processing apparatus 1) may have a configuration such that the application includes an interface part (application programming interface (API)) for specifying the determination information described above. This configuration allows the application to specify the determination information that directly indicates whether to perform the first access or the second access to read or write the data, when a memory area is allocated in which data included in the first data to be processed by the application is to be arranged.

As described above, in the present embodiment, when the page to be read from or written to among the pages included in the first data in the second memory 30 is a page with high access locality (first page), the first access is executed to perform the swap processing to move the page to the first memory 20, and then to read or write the page moved to the first memory 20, or when the page to be read from or written to is a page with low access locality (second page), the second access is executed to directly read or write the data from or to the second memory 30. As a result, the time and the power required for the swap processing can be restrained as much as possible from being wasted. This can increase the efficiency of the processing.

First Modification of First Embodiment

Figure 7:
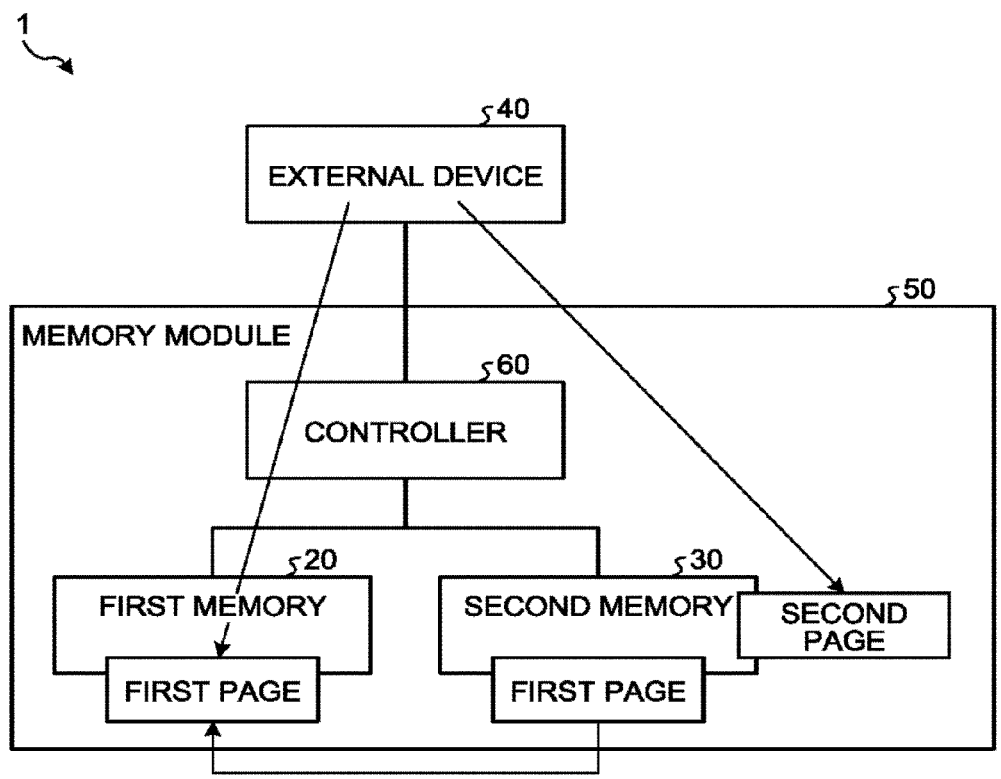
FIG. 7 is a diagram illustrating an exemplary configuration of an information processing apparatus according to a modification.

For example, the virtual memory of the OS may be configured not to be used. For example, as illustrated in FIG. 7, the information processing apparatus 1 may include an external device 40 that executes the first processing to process the first data and also a memory module 50. In the example of FIG. 7, the memory module 50 includes the first memory 20 described above, the second memory 30 described above, and a controller 60 that moves data (page-by-page data, in this example) between the first and second memories 20 and 30. Hardware dedicated to data transfer (DMA controller) is desirably provided for moving the data.

In the example of FIG. 7, the functions provided by the OS (functions of, for example, the access controller 111) described above are performed by the controller 60 serving as a hardware element. In this example, after receiving a request from the external device 40 for reading or writing data, the controller 60 performs the first access or the second access using the page table described above in the memory module 50, in the same manner as in the first embodiment described above.

That is, the memory module 50 (storage device) of the present modification includes the controller 60 that controls the reading and writing of data performed by a processing device (the external device 40, in this example) that executes the first processing to process the first data constituted by a plurality of pages, and also includes the first memory 20 and the second memory 30. In the same manner as in the first embodiment described above, the pages included in the first data include the first page that is read or written a number of times equal to or more than the threshold and the second page that is read or written a number of times less than the threshold in the certain period shorter than the processing period for executing the first processing. The controller 60 has the following function: when the page to be read from or written to is the first page, the controller 60 executes the first access to perform the swap processing to move the page to the first memory 20, and then to read or write the page moved to the first memory 20, or when the page to be read from or written to is the second page, the controller 60 executes the second access of directly reading or writing the data from or to the second memory 30 (corresponding to the function of the access controller 111). The specific details are the same as those of the first embodiment described above, and thus, the detailed description will not be repeated.

From another point of view, it can be considered that, when reading or writing the first data in the second memory 30, the controller 60 (access controller 111) performs the first access and the second access of directly reading or writing the data from or to the second memory 30 so that the ratio of the amount of reading or writing of data from or to the first memory 20 performed by the external device 40 (processing device) is larger than the above-described ratio obtained when the whole first data is read or written by execution of the first access, relative to the amount of data transfer between the first memory 20 and the second memory 30 that occurs along with the first access of reading or writing the page moved into the first memory 20 after the execution of the swap processing of moving the page in the second memory 30 to the first memory 20. Also in this case, it can be considered that the pages included in the first data in the second memory 30 include the first page that is read or written a number of times equal to or more than the threshold and the second page that is read or written a number of times less than the threshold in the certain period shorter than the processing period for executing the first processing, and that the controller 60 performs the first access when the page to be read from or written to is the first page, and performs the second access when the page to be read from or written to is the second page.

It can also be considered that, when reading or writing the first data in the second memory 30, the controller 60 (access controller 111) performs the first access and the second access of directly reading or writing the data from or to the second memory so that the sum of the power consumption of the first memory 20 and the power consumption of the second memory 30 is smaller than the power consumption generated when the whole first data in the second memory 30 is read or written by execution of the first access of reading or writing the page moved into the first memory 20 after the execution of the swap processing of moving the page included in the first data in the second memory to the first memory 20. Also in this case, it can be considered that the pages included in the first data in the second memory 30 include the first page that is read or written a number of times equal to or more than the threshold and the second page that is read or written a number of times less than the threshold in the certain period shorter than the processing period for executing the first processing, and that the controller 60 performs the first access when the page to be read from or written to is the first page, and performs the second access when the page to be read from or written to is the second page.

Second Modification of First Embodiment

For example, the application may perform a part (or all) of the swap processing without leaving it to the virtual memory system of the OS. That is, if, for example, the OS detects that a page to be read from or written to (target page) is not present in the second memory 30, the OS may pass control to the application; the application may, in turn, determine whether the target page is the first page or the second page, and if the target page is determined to be the first page, the application may use an application's own swap processing algorithm to determine which page in the first memory 20 is to be transferred to the second memory 30; and then, the application may transfer the page and perform the swap processing of copying the target page to the first memory 20, and may leave the changing of the page table to the OS.

Third Modification of First Embodiment

For example, the hint information described above may be configured to specify, as the determination information, information indicating whether each piece of data having the predetermined size included in the first data is randomly accessed data. In the case of setting the page table described above, the access controller 111 determines that the data having the predetermined size specified to be the randomly accessed data by the determination information is to be read or written by execution of the second access (the present modification differs from the first embodiment in that this determination processing is performed), and sets the access information indicating that the second access is to be performed to read from or write to one or more pages corresponding to the data having the predetermined size. The OS (information processing apparatus 1) may have the configuration such that the application includes the interface part (API) for specifying the determination information described above.

Fourth Modification of First Embodiment

For example, the second memory 30 described above may be a nonvolatile memory, and the hint information described above may be configured to specify, as the determination information, information indicating whether each piece of data having the predetermined size included in the first data is persistent data representing data to be kept in the second memory 30. In the case of setting the page table described above, the access controller 111 determines that the data having the predetermined size specified to be the persistent data by the determination information is to be read or written by execution of the second access (the present modification differs from the first embodiment in that this determination processing is performed), and sets the access information indicating that the second access is to be performed to read from or write to one or more pages corresponding to the data having the predetermined size. The OS (information processing apparatus 1) may have the configuration such that the application includes the interface part (API) for specifying the determination information described above.

Fifth Modification of First Embodiment

For example, the hint information described above may be configured to specify, as the determination information, information indicating that each piece of data having the predetermined size included in the first data is data to be used by the application in the near future. Since the data is to be used by the processor 10 in the near future, the data is moved to a location closer to the processor cores 101 before the application starts accessing the data, and thereby can be quickly accessed. At this time, the data is move to different locations depending on whether the data is to be read or written by execution of the first access described above or the second access described above. If the data is included in one or more pages associated with the access information indicating that the first access described above is to be performed to perform reading or writing, the swap processing is stared to transfer the page or pages corresponding to the data from the second memory 30 to the first memory 20, before the application actually starts accessing the data. If, instead, the data is included in the page or pages associated with the access information indicating that the second access described above is to be performed to perform reading or writing, one or more cache lines (unit information held in the cache memory included in the processor 10) corresponding to the data are started to be transferred to the last level cache included in the processor 10, before the application actually starts accessing the data. To sum up, the determination information described above may include the information indicating that each piece of data having the predetermined size is to be accessed after the determination information is received from the application, and the access controller 111 may be configured as follows: when the data having the predetermined size corresponds to the page or pages associated with the access information indicating that the first access is to be performed to perform reading or writing, the access controller 111 starts the processing to transfer the page or pages corresponding to the data to the first memory 20 before the application starts accessing the data, or if the data having the predetermined size corresponds to the page or pages associated with the access information indicating that the second access is to be performed to perform reading or writing, the access controller 111 starts the processing to transfer one or more cache lines corresponding to the data to the cache memory (last level cache) included in the processor 10 before the application starts accessing the data. The OS (information processing apparatus 1) may have the configuration such that the application includes the interface part (API) for specifying the determination information described above.

Sixth Modification of First Embodiment

For example, the hint information described above may be configured to specify, as the determination information, information indicating a frequency at which each piece of data having the predetermined size included in the first data is rewritten. In the case of setting the page table described above, the access controller 111 determines to perform the second access to read or write the data having the predetermined size for which the determination information is specified indicating the access frequency of lower than a reference value (the present modification differs from the first embodiment in that this determination processing is performed), and sets the access information indicating that the second access is to be performed to read from or write to one or more pages corresponding to the data having the predetermined size. The OS (information processing apparatus 1) may have the configuration such that the application includes the interface part (API) for specifying the determination information described above.

Second Embodiment

The following describes a second embodiment.

Description will be omitted for parts common to those of the first embodiment described above, where appropriate. In the present embodiment, in the page table (correspondence information) described above, the size of the page associated with the access information indicating that the second access is to be performed to perform reading or writing is larger than the size of the page associated with the access information indicating that the first access is to be performed to perform reading or writing. That is, the size of the second page is larger than the size of the first page. The specific details will be described below.

An increase in memory size brought by introduction of large-capacity nonvolatile memories poses a new problem that performance is significantly affected by increase in the number of misses in accessing a translation lookaside buffer (TLB) (hereinafter, such miss will be called "TLB miss" in some cases). The TLB refers to a cache (which can be considered as a copy of a part of the correspondence information held in the processor 10) of entries of the page table (data serving as units of the page table (row-by-row data in the example of FIG. 5)) described above. If the entries of the page table have been cached into the processor 10, addresses can be quickly converted. If, however, the number of entries of the page table to be cached has so increased as to exceed the number of entries of the TLB, the TLB miss frequently occurs, necessitating accesses to the page table to solve the TLB miss. The accesses to the page table cause a new overhead, and deteriorate the performance of the application. The increase in memory size brought by the use of the large-capacity nonvolatile memories increases the amount of data necessary to be managed, and increases the size of the page table, thereby leading to an increase in the number of TLB misses. Assume a case in a database manipulation by a database application where small-scale accesses, for example, on a per several-byte basis randomly occur, and each page uses only roughly several bytes. In this case, an entry of the TLB is needed for each access to the several bytes, thus quickly leading to frequent occurrence of the TLB misses.

Hence, the present embodiment solves the problem described above by increasing the size of the page with low access locality (second page). Increasing the page size reduces the necessary number of entries of the page table, and thereby can prevent the frequent occurrence of the TLB misses. The large page size is not always favorable. Assume a case of a conventional virtual memory system where only the first access is available. In this case, when the application uses only several bytes in a page having a large page size, the useless data transfer increases with the page size. That is, the amount of access to the first memory 20 decreases relative to the amount of data transfer (amount of data transfer between the memories) associated with the swap processing. Therefore, the pages having a large page size needs to be reduced.

In the present embodiment, the second page with low access locality is accessed through direct access to the second memory 30, so that the data transfer associated with the swap processing does not occur. Consequently, the largeness of the page size does not result in a penalty to the second page with low access locality. For this reason, such data with low access locality is accessed through direct access to the second memory 30, and is managed based on a page size larger than that of data with high access locality. Specifically, in the page table described above, the size of the page associated with the access information indicating that the second access is to be performed to perform reading or writing (size of the second page) is larger than the size of the page associated with the access information indicating that the first access is to be performed to perform reading or writing (size of the first page). The size of the first page is managed based on a first page size, and the size of the second page is managed based on a second page size larger than the first page size. The first page size is, for example, a normal page size of the OS, such as 4 KB. The second page size is a larger size, such as 4 MB or 4 GB, than the first page size, and is preferably a multiple of the first page size.

The access controller 111 can set the size of all pages included in the first data to the second page size, and, when the first page is read or written (when the first access is performed to read or write the first page), can change the page size of the first page from the second page size to the first page size. That is, the data in the second memory 30 to be accessed by execution of the first access (data corresponding to the first page) may be managed based on the second page size until being actually accessed, and may be switched to be managed based on the first page size when starting to be actually accessed by execution of the first access. At that time, the page that has been managed based on the second page size (first page that has been managed based on the second page size) until then is divided into a plurality of pages, each having the first page size. For example, if the first page size has been 4 KB and the second page size has been 4 MB, each 4 MB page size is divided into 1024 pages, each having a page size of 4 KB.

Figure 8:
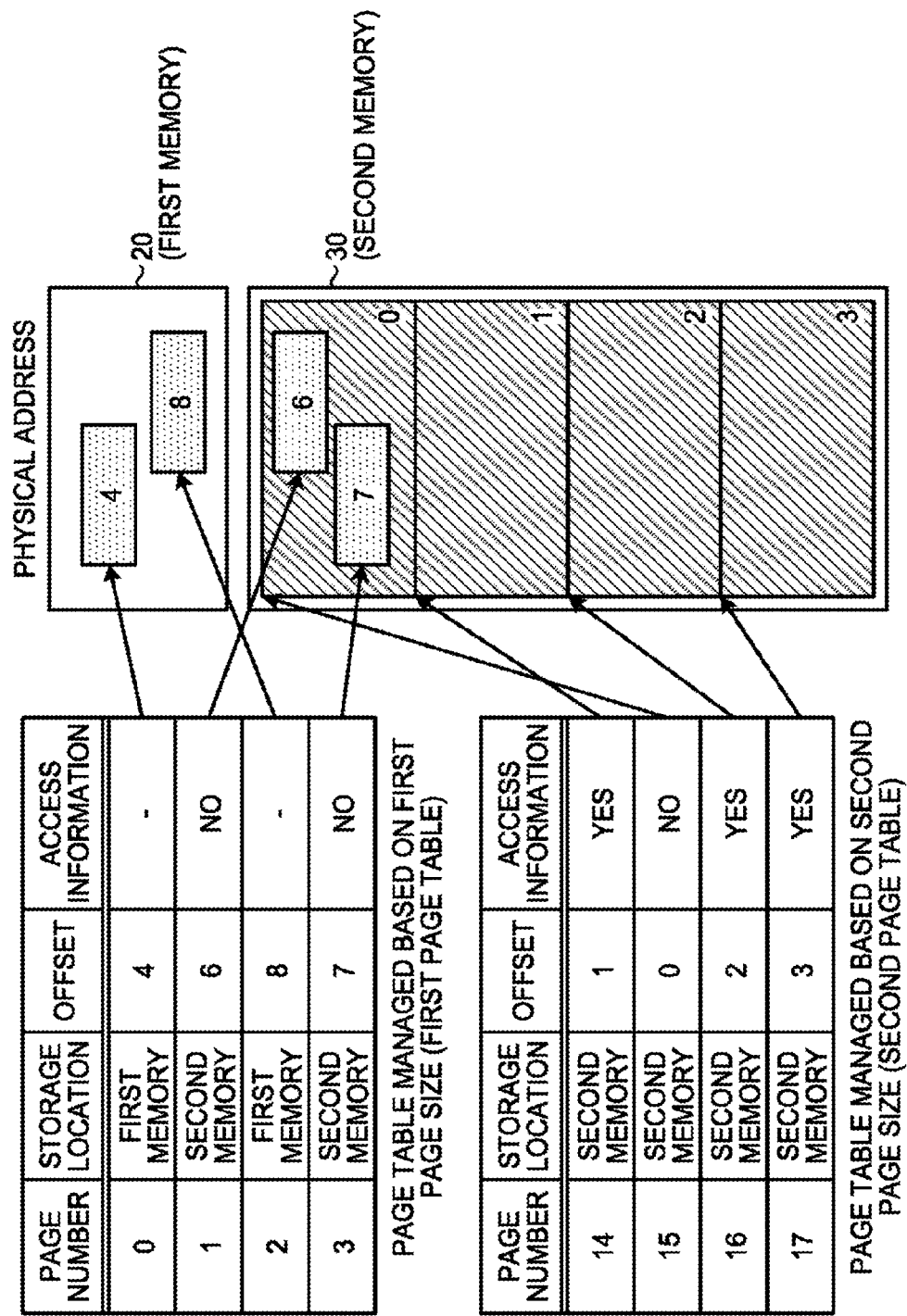
FIG. 8 is a diagram for explaining page tables according a second embodiment.

For example, when the page table described above is used to convert the virtual addresses (page numbers) into the physical addresses, a case occurs where the conversion processing is performed using at the same time a page table that manages the pages based on the first page size (called "first page table", for convenience of description) and a page table that manages the pages based on the second page size (called "second page table", for convenience of description), and as a result, two sets of physical addresses (pages) are found, as illustrated in FIG. 8. One is a page having the first page size, and the other is a page having the second page size. In the example, of FIG. 8, for example, a case is assumed where physical addresses located from an offset of "6" in the second memory 30 and having the first page size and physical addresses located from an offset of "0" in the second memory 30 and having the second page size are obtained. In this case, a page corresponding to the physical addresses located from the offset of "0" in the second memory 30 and having the second page size is to be accessed by execution of the first access (associated with the access information indicating "No"), so that a higher priority is put on conversion results obtained using the page table that manages the pages based on the first page size, even though the two pages are found. That is, the conversion results are the physical addresses located from the offset of "6" in the second memory 30 and having the first page size. The page is accessed by execution of the first access. The page tables of FIG. 8 are merely examples. A plurality of page sizes may be managed by a plurality of page tables, or may be managed by one page table.

To sum up, the page table (correspondence information) described above may include the first page table (first correspondence information) that manages the pages based on the first page size and the second page table (second correspondence information) that manages the pages based on larger size than the first page size. The first page table associates each of a plurality of pages having the first page size with at least the virtual addresses, the physical addresses, and the access information described above. The second page table associates each of a plurality of pages having the second page size with at least the virtual addresses, the physical addresses, and the access information described above. The access controller 111 uses both the first and second page tables to perform the conversion processing for converting the virtual addresses allocated to the data requested to be accessed from the application into the physical addresses. If corresponding sets of physical addresses are obtained from both the conversion processing using the first page table and the conversion processing using the second page table, the access controller 111 can determine, for example, the physical addresses obtained by the conversion processing using the first page table to be the conversion results.

In the above-described manner, the page size of the page accessed by execution of the second access (second page) is increased, and thereby, the number of entries of the page table can be reduced (the number of TLB misses can be reduced). Furthermore, in addition to the reduction in the necessary number of entries of the page table due to the increase in the page size of the second page, the page size of the first page accessed by execution of the first access can be actively reduced as long as the number of TLB misses can be limited to a predetermined value (or as long as the size of the page table can be limited to a predetermined size). In this case, the page size of the first page is smaller than, for example, 4 KB, which is generally used by existing OSs for management, and is, for example, 1 KB, 512 bytes, 256 bytes, 128 bytes, 64 bytes, or 32 bytes. The size of the page may be, for example, the cache line size of an L1 cache, the L2 cache, the L3 cache, or the last level cache (LLC) of the processor 10.

Also in the present embodiment, in the same manner as in the embodiment described above, the first access is performed when the page to be read from or written to is a page with high access locality (first page), and the second access is performed when the page to be read from or written to is a page with low access locality (second page). From another point of view, when the first data in the second memory 30 is read or written, the first access and the second access are performed so that the ratio of the amount of reading or writing of data from or to the first memory 20 performed by the processor 10 is larger than the above-described ratio obtained when the whole first data is read or written by execution of the first access, relative to the amount of data transfer between the first memory 20 and the second memory 30 that occurs along with the first access. In addition to the above description, the access controller 111 can also set the page size of the first page to a value smaller than the first page size as long as the number of times of the TLB misses is equal to or smaller than the predetermined value (as long as the speed performance of the application can be guaranteed). If the page size can be reduced, the percentage of data used in the page increases. Hence, the time and the power associated with the useless data transfer can be reduced, and the ratio of the amount of reading or writing of data from or to the first memory 20 performed by the processor 10 can be further increased relative to the amount of data transfer between the first memory 20 and the second memory 30 that occurs along with the first access. As a result, the sum of the power consumption of the first memory 20 and the second memory 30 can be reduced.

The size of the data accessed by execution of the first access (number of the first pages) differs from application to application. If the number of the first pages exceeds a predetermine value, the number of pages of the whole system (sum of the numbers of the first and second pages) increases to a certain extent even if the page size of the second page is increased. For this reason, to prevent the TLB misses, the page size cannot be reduced so actively as to cause the TLB misses. However, when the number of the first pages is smaller than the predetermine value, increasing the page size of the second page can reduce the total number of pages to a relatively small value, and thereby can reduce the page size of the first page as long as the TLB miss does not occur. For example, the page size of the first page can be set to 1 KB, 512 bytes, 256 bytes, 128 bytes, 64 bytes, or 32 bytes. The size of the page may be, for example, the cache line size of the L1 cache, the L2 cache, the L3 cache, or the last level cache (LLC) of the processor 10.

Assume, for example, that the information processing apparatus 1 supports three page sizes, which are a third page size, the second page size, and the first page size, in descending order of the page size. For example, the third page size may be 4 MB; the second page size may be 4 KB; and the first page size may be 512 bytes. If the page size is selectable page by page, the second pages can be managed based on the third page size, and the first pages can be managed based on a selected one of at least the first page size and the second page size as follows: when the number of the first pages is equal to or larger than the predetermined value, the first pages are managed based on the second page size, or when the number of the first pages is smaller than the predetermined value, the first pages are managed based on the first page size. That is, the pages managed by the page table described above may be configured to be managed based on various page sizes as follows: the second pages are managed based on the third page size, and the first pages are selectively managed either based on the second page size smaller than the third page size, or based on the first page size smaller than the second page size. The access controller 111 can set the page size of the first pages to the second page size (manage the first pages based on the second page size) when the number of the first pages is equal to or larger than the predetermined value, and set the page size of the first pages to the first page size (manage the first pages based on the first page size) when the number of the first pages is smaller than the predetermined value. The predetermined value described above may be expressed, for example, as a multiple of the capacity of the first memory 20 (DRAM), or as a data size selected as a changing point where the TLB miss rate changes from before to after the point, but is naturally not limited to these examples. The method of management described above is applicable to the information processing apparatus 1 having the virtual memory of the OS, to the memory module 50, and to the other embodiments.

Third Embodiment

The following describes a third embodiment. Description will be omitted for parts common to those of the first embodiment described above, where appropriate. In the present embodiment, during a first period in the processing period for executing the first processing of processing the first data, the all pages included in the first data are set as the second pages, and the second pages are switched to the first pages based on the state of reading or writing of the data from or to the second memory 30 during the first period. The specific details will be described below.

In the embodiments described above, the application that processes the first data specifies the hint information to the OS or the controller 60. However, the OS or the controller 60 can monitor the memory access, and can automatically create the hint information from, for example, statistical information on the memory access (information indicating, for example, which data has been accessed how many times during the first period in the processing period (in a part or all of the processing period)).

Although description will be made assuming the configuration illustrated in FIG. 7 for convenience of description, the configuration is not limited to this. Since the controller 60 controls the memory access to the first and second memories 20 and 30, the controller 60 can monitor and record what kind of memory access is performed. Hence, at first, the all pages included in the first data in the second memory 30 are set as the second pages, and the application is executed. At any time while the application is running, or at the time when the application ends, the controller 60 can acquire the state of the memory access up to that time (during the first period), and can switch pages that have been used a number of times equal to or more than the threshold during the first period from the second pages to the first pages, based on the statistical information obtained from the state of the memory access. That is, the controller 60 (access controller 111) can switch the pages that have been read or written a number of times equal to or more than the threshold during the first period among the pages included in the first data in the second memory 30 from the second pages to the first pages (for example, can set the access information in the above-described page table corresponding to the pages to be switched to access information indicating "No"). The switching may be made at any time, that is, may be made while the application is running, or may be made when the next application is started.

The statistical information refers to, for example, the access frequency to each of a plurality of pages included in the first data. While the page data in the page is accessed, for example, on a per cache line size basis of the external device, such as the processor 10, the number of pieces of page data accessed in the page or information indicating the number of times of access to the page data in the page (information indicating the number of times of use of the page during the first period describe above) can be used as the access frequency. In this case, when the external device 40 (processor 10) processes the data in any page in the second memory 30, the controller 60 transfers (swaps in) the page to the first memory 20 and switches the access information corresponding to the page to the access information indicating "No" (switches the page from the second page to the first page), when the number of times of use of the page exceeds the threshold mentioned above. As a result, the page is accessed by execution of the first access from then on.

Figure 9:
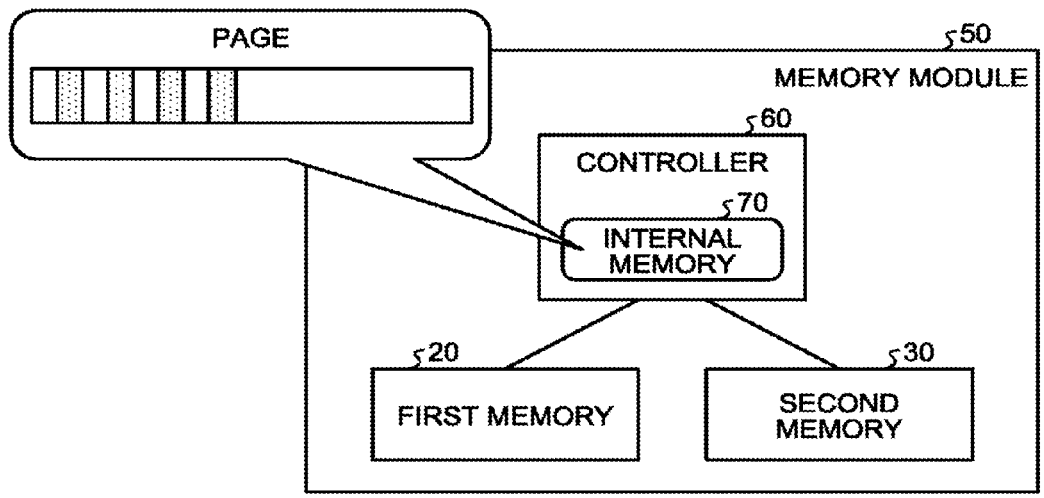
FIG. 9 is a diagram illustrating an exemplary configuration of an information processing apparatus according to a third embodiment.

For example, as illustrated in FIG. 9, the controller 60 further includes an internal memory 70 representing a memory in the controller 60, and the controller 60 can record the results of reading or writing of the data during the first period and store the recorded results in the internal memory 70. The controller 60 can also perform the swap processing to move, from the internal memory 70 to the first memory 20, the data recording the results of reading or writing from or to the internal memory 70 among the pieces of data (page data) included in the pages that have been read or written a number of times equal to or more than the threshold during the first period, and to move remaining data from the second memory 30 to the first memory 20. In this example, when any of the pages included in the first data has been used a number of times equal to or more than the threshold mentioned above, the controller 60 transfers the page to the first memory 20. In this transfer operation, the controller 60 transfers the page data stored in the internal memory 70 among the pieces of page data in the page from the internal memory 70 to the first memory 20, transfers the remaining data not stored in the internal memory 70 from the second memory 30 to the first memory 20, and switches the page from the second page to the first page (switches the access to the page from the second access to the first access).

The statistical information, such as the access frequency to each of the pages included in the first data, need not be acquired for every page. For example, several pages in a certain range of a memory area may be sampled (selected), and a determination may be made, based on the result, as to whether the memory area is to be subjected to the first access or the second access. For example, if many pages have been read or written a number of times equal to or more than the threshold during the first period, the memory area for the pages may be determined to be subjected to the first access.

The controller 60 may learn the various types of hint information described mainly in the modifications of the first embodiment given above, and automatically generate the hint information. While, in the present embodiment, the example of learning by the controller 60 has been described, the learning may naturally be performed by the OS. That is, this method is applicable to the information processing apparatus 1 having the virtual memory of the OS, and to the other embodiments. The learning may be performed, for example, using machine learning.

To sum up, the access controller 111 (controller 60 or a function of the OS) can set the all pages included in the first data as the second pages during the first period in the processing period for executing the first processing of processing the first data, and can switch the second pages to the first pages based on the state of reading or writing of the data from or to the second memory 30 during the first period. More specifically, the access controller 111 can switch the pages that have been read or written a number of times equal to or more than the threshold during the first period among the pages included in the first data from the second pages to the first pages. The access controller 111 further includes the internal memory 70 representing the memory in the processing device (the controller 60 or the processor 10). The access controller 111 can record the results of reading or writing of the data during the first period and store the recorded results in the internal memory 70, and can perform the movement processing to move, from the internal memory 70 to the first memory 20, the data recording the results of reading or writing from or to the internal memory 70 among the pieces of data included in the pages that have been read or written a number of times equal to or more than the threshold during the first period, and to move the remaining data from the second memory 30 to the first memory 20.

Fourth Embodiment

The following describes a fourth embodiment. Description will be omitted for parts common to those of the first embodiment described above, where appropriate. In the present embodiment, the second memory 30 is a nonvolatile memory, and when a page to be written to is the first page, the access controller 111 performs the swap processing to move the page to the first memory 20, and then writes data to the page that has been moved to the first memory 20, and the access controller 111 also leaves a copy page representing a copy of the page in the second memory 30, and writes the same data to the copy page in the second memory 30. More specifically, if data to be written is data (persistent data) to be stored in the second memory 30 (nonvolatile memory), and when a page corresponding to the data is the first page, the access controller 111 performs the swap processing to move the page (called the target page) to the first memory 20, and then writes (by execution of the first access) the data (data to be written, or update data) to the target page that has been moved to the first memory 20, and the access controller 111 also leaves a copy page representing a copy of the target page in the second memory 30, writes (by execution of the second access) the same data to the copy page in the second memory 30, and discards the written content (target page) in the first memory 20. Thus, the written content (copy page to which the data has been written) in the second memory 30 is made persistent. The specific details will be described below.

The description of the embodiments above has focused on the method of providing a high-speed, large-capacity memory space by combining the main memory with the large-capacity NVM. Here, description will first be given of a method of providing a high-speed, nonvolatile large-capacity memory space by combining the main memory constituted by a volatile memory, such as the DRAM, with the large-capacity NVM. That is, in the present embodiment, it can appear to the application that a high-speed nonvolatile memory device is present as a whole, although the DRAM as a volatile memory is used as the main memory. If the first memory 20 is a volatile memory such as the DRAM, for the purpose of storing data written to a page that has been paged into the first memory 20 by execution of the first access, the data written can be stored (made persistent) in the nonvolatile memory (second memory 30) by being paged out (transferred to the second memory 30). However, a faster method will be described. Although the present embodiment assumes that the data to be written is the data (persistent data) to be stored in the second memory 30 (nonvolatile memory), the method for speeding up and power saving to be described below is not limited to that case, but is naturally applicable to the more versatile methods described in the embodiments above of providing the high-speed, large-capacity memory space by combining the main memory with the large-capacity NVM. For example, the page-out processing commonly occurs in the swap processing when the first access is used, even if the data need not be made persistent. Therefore, the method of simultaneous writing to the second memory 30 is effective to reduce processing time and power consumed for the page-out to be described later.

In the embodiments described above, to provide the high-speed, large-capacity memory space, the first access is performed when the page to be read from or written to is a page with high access locality (first page), and the second access is performed when the page to be read from or written to is a page with low access locality (second page). From another point of view, when the first data in the second memory 30 is read or written, the first access and the second access are performed so that the ratio of the amount of reading or writing of data from or to the first memory 20 performed by the processor 10 is larger than the above-described ratio obtained when the whole first data is read or written by execution of the first access, relative to the amount of data transfer between the first memory 20 and the second memory 30 that occurs along with the first access. The present embodiment is the same in this respect as the embodiments described above. In addition to using the method described above, the present embodiment efficiently uses the first memory 20 by use of the second access so as to increase the speed of the nonvolatile large-capacity memory space. In this case, when the data (page data to be written) is written to the first memory 20 by execution of the first access, the same data is written to the copy of the data in the second memory 30 by execution of the second access so as to keep the result of writing (writing result) in the first memory 20 to be always the same as the writing result in the second memory 30. Thereby, the writing result can be quickly stored in the second memory 30 by only discarding the writing result in the first memory 20 when the writing result is made persistent. When the data in the first memory 20 is read by execution of the first access, the data only needs to be read from the first memory 20 in the same way as before.

Figure 10:
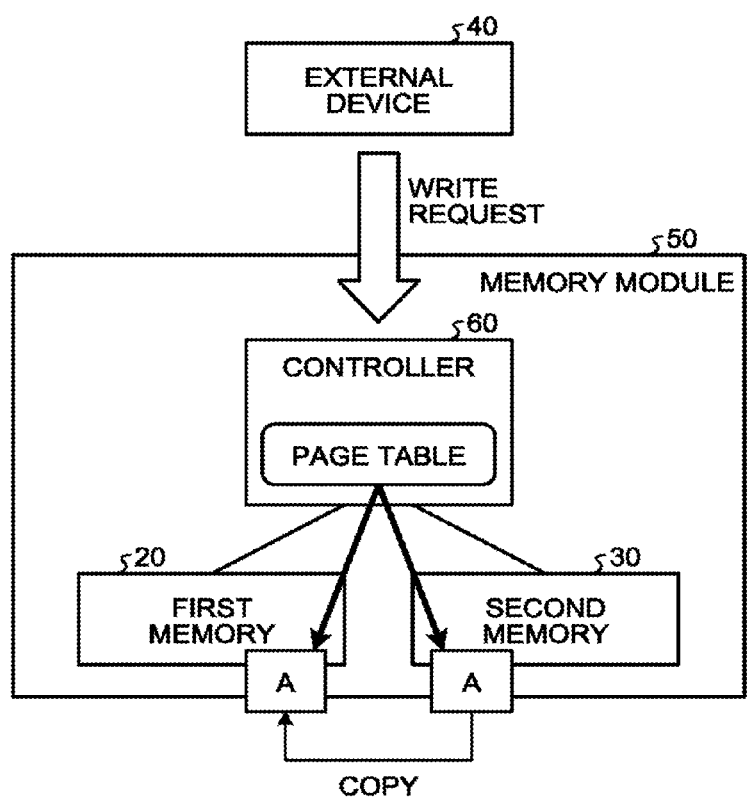
FIG. 10 is a diagram for explaining an operation according to a fourth embodiment.

Although description will be made assuming the configuration illustrated in FIG. 7 for convenience of description, the configuration is not limited to this. When the writing is performed by execution of the first access, the page to be written to (page including the page data to be written) is transferred to the first memory 20, and then, the writing is performed to the page (the page data to be written is updated). The same data (written content) is written to the second memory 30 during the writing. Assume, for example, a case where data A in the second memory 30 is data to be stored (persistent data), as illustrated in FIG. 10. In that case, if the controller 60 receives a write request from the external device 40 (any of the processor cores 101) requesting to write data to the data A that needs to be stored in the second memory 30, the controller 60 transfers a page corresponding to the data A (target page) to the first memory 20, and writes the data to the target page transferred to the first memory 20. At the same time, the controller 60 leaves a copy of the data A in the second memory 30, and writes the same data to the copy of the data A left in the second memory 30. That is, a state is established in which the pages including the written content are simultaneously present in the first and second memories 20 and 30. In response to subsequent write requests, the controller 60 behaves in the same manner (that is, writes data to both memories). In response to subsequent read requests, the controller 60 performs control to read data from the first memory 20 allowing high-speed access, in the same manner as the access by execution of the first access. When the data is made persistent, the corresponding data in the first memory 20 only needs to be discarded after being written to the second memory 30. Discarding the data means, for example, that conversion information to the page location in the first memory 20 is discarded from the setting in the page table for the page corresponding to the data. As described above, the pages in the first memory 20 are written to the second memory 30 as needed. As a result, the data can be stored faster than in the case of transferring the pages in the first memory 20 to the second memory 30 after a sequence of writing processes are completed. In this manner, it can appear to the application that the high-speed nonvolatile memory device is present as a whole.

Figure 11:
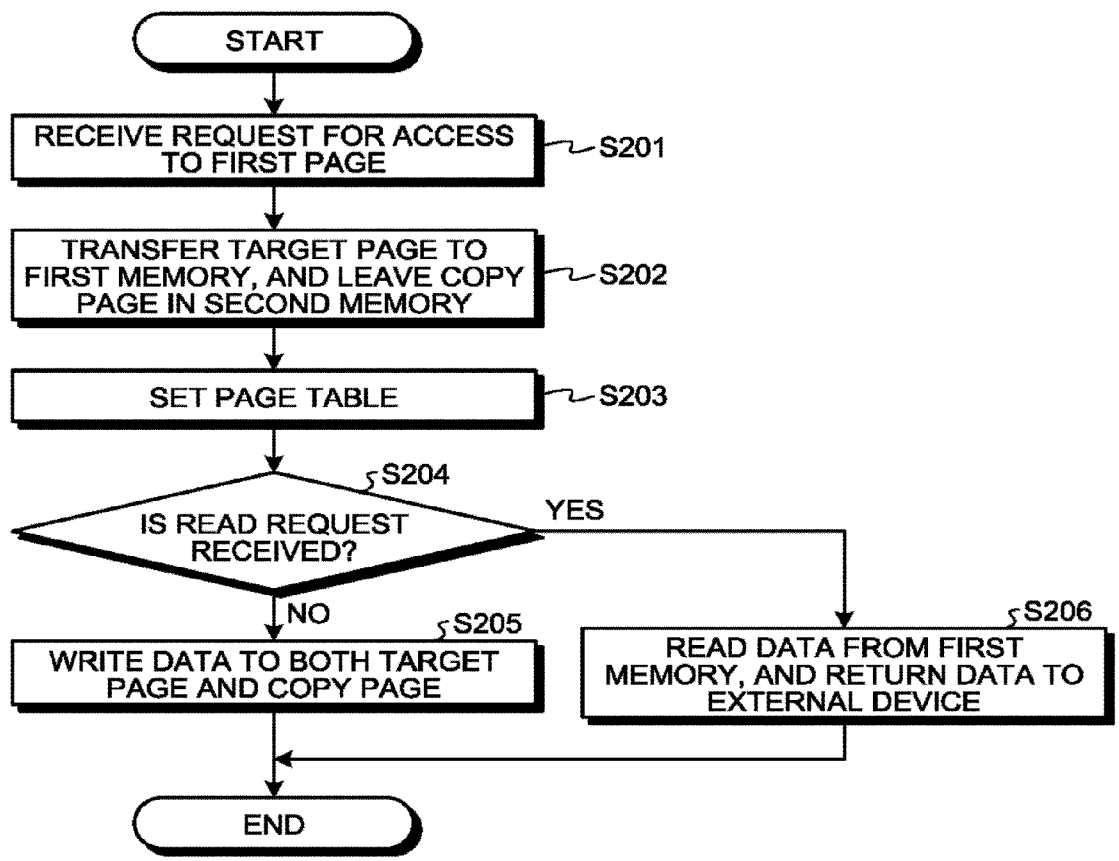
FIG. 11 is a diagram illustrating an operation example of an information processing apparatus of the fourth embodiment.
Figure 12:
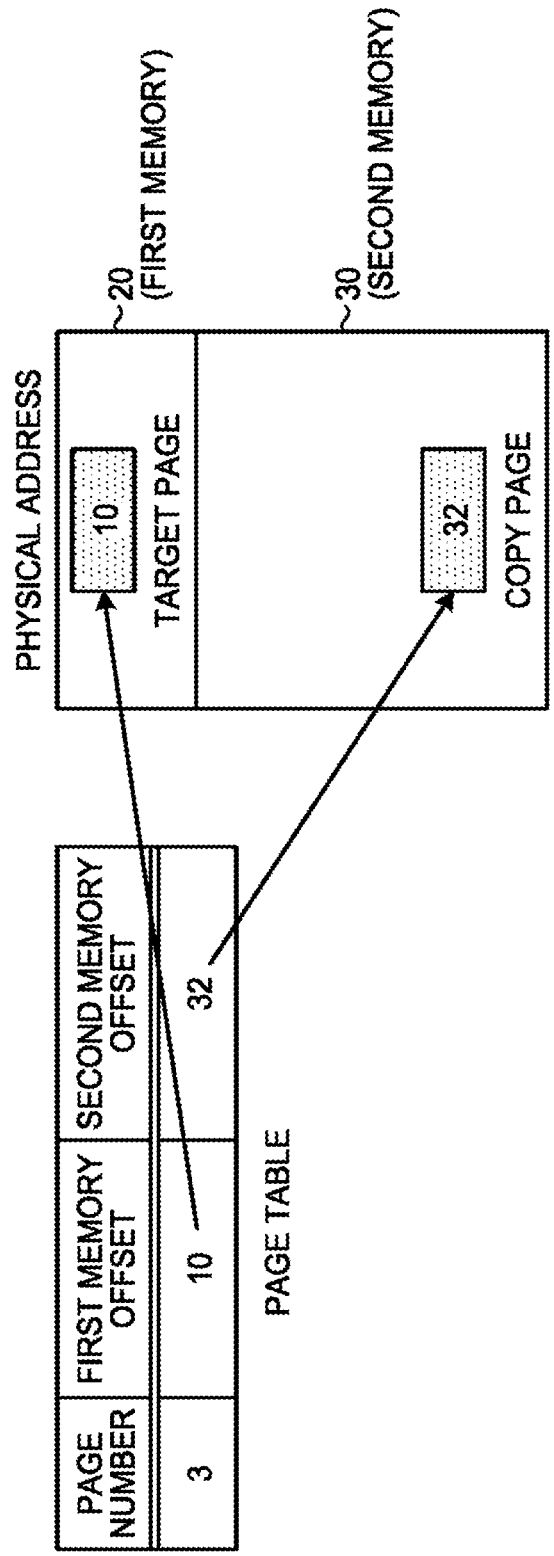
FIG. 12 is a diagram for explaining a method for setting a page table of the fourth embodiment.

FIG. 11 is a flowchart illustrating an operation example of the controller 60 of the present embodiment. The example of FIG. 11 assumes that the controller 60 receives, from the external device 40, a request for access to the first page at Step S201. The controller 60 then performs control to transfer the first page requested to be accessed (hereinafter, called "target page") in the second memory 30 to the first memory 20, and to leave a copy of the target page (hereinafter, called "copy page") in the second memory 30 (Step S202). Then, as illustrated in FIG. 12, the controller 60 sets a page table in which the page number corresponding to the target page is associated with an offset (first memory offset) indicating the location of the target page in the first memory 20 and an offset (second memory offset) indicating the location of the copy page in the second memory 30 (Step S203).

Figure 13:
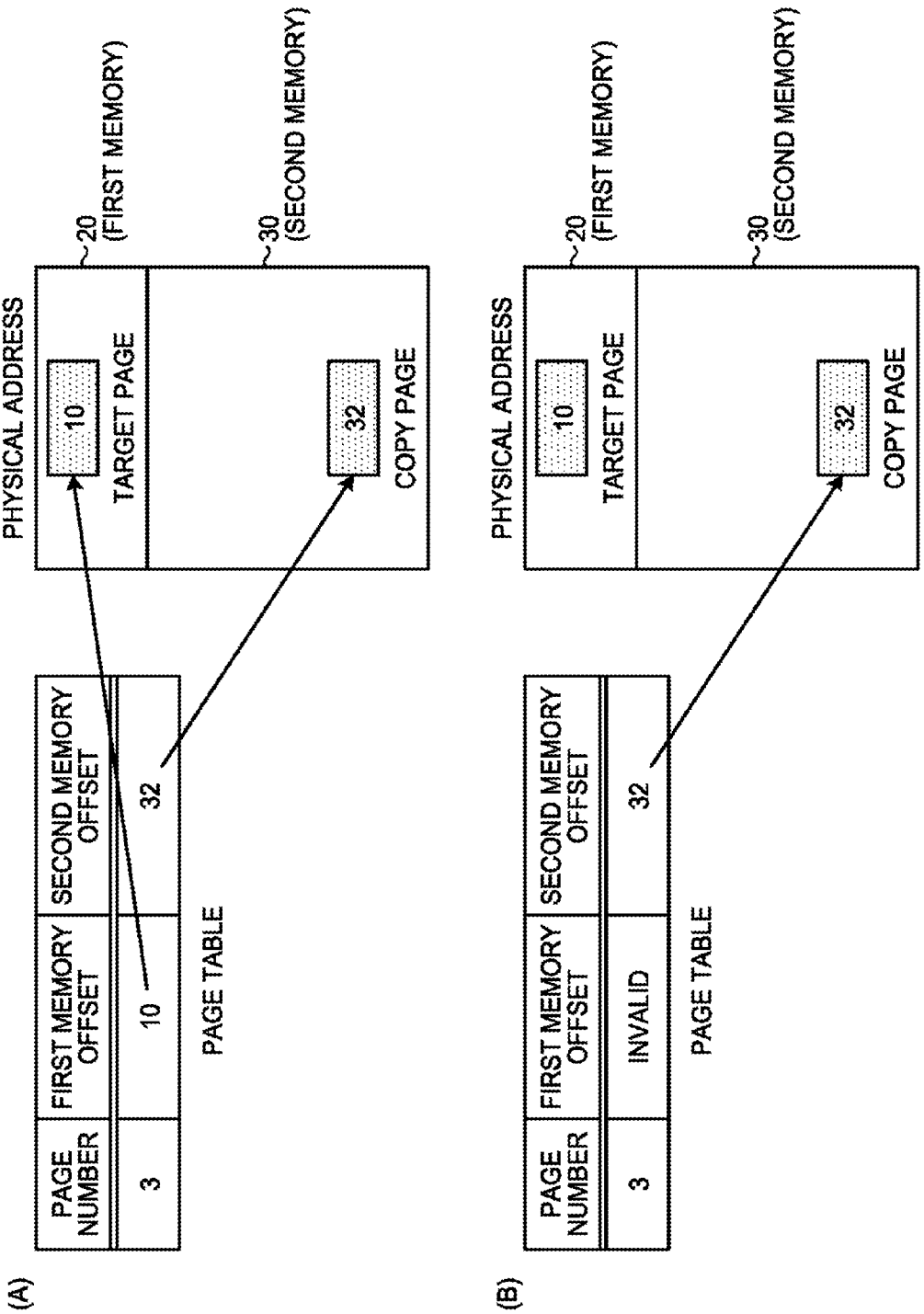
FIG. 13 is a diagram for explaining the method for setting the page table of the fourth embodiment.

If the access request received at Step S201 is a write request (No at Step S204), the controller 60 writes data to both the target page and the copy page (Step S205). In the case of storing the written data, the controller 60 sets the page table so as to change the state thereof from the state of (A) to the state of (B) in FIG. 13. That is, the first memory offset indicating the page in the first memory 20 is set to an invalid state.

If the access request received at Step S201 is a read request (Yes at Step S204), the controller 60 reads data (reads data to be read in the target page transferred to the first memory 20) from the first memory 20, and returns the read data to the external device 40 (Step S206).

The present embodiment increases the speed of the system, and also achieves the power saving. In general, a nonvolatile memory consumes higher power than a volatile memory, such as a DRAM, during access. Therefore, it is important to reduce the number of times of read and write operations. The nonvolatile memory is particularly characterized in consuming higher power in writing than in reading. Therefore, how to reduce the number of times of write operations is very important from the viewpoint of power saving.

Also in the present embodiment, in the same manner as in the embodiments described above, the first access is performed when the page to be read from or written to is a page with high access locality (first page), and the second access is performed when the page to be read from or written to is a page with low access locality (second page). From another point of view, it can be considered that when the first data in the second memory 30 is read or written, the first access and the second access are performed so that the ratio of the amount of reading or writing of data from or to the first memory 20 performed by the processor 10 is larger than the above-described ratio obtained when the whole first data is read or written by execution of the first access, relative to the amount of data transfer between the first memory 20 and the second memory 30 that occurs along with the first access. This is also for the purpose of making the power consumption more efficient. In other words, it is because the reading and writing of the second memory 30 can be reduced by accessing the page with high access locality through the first memory 20.

Figure 14:
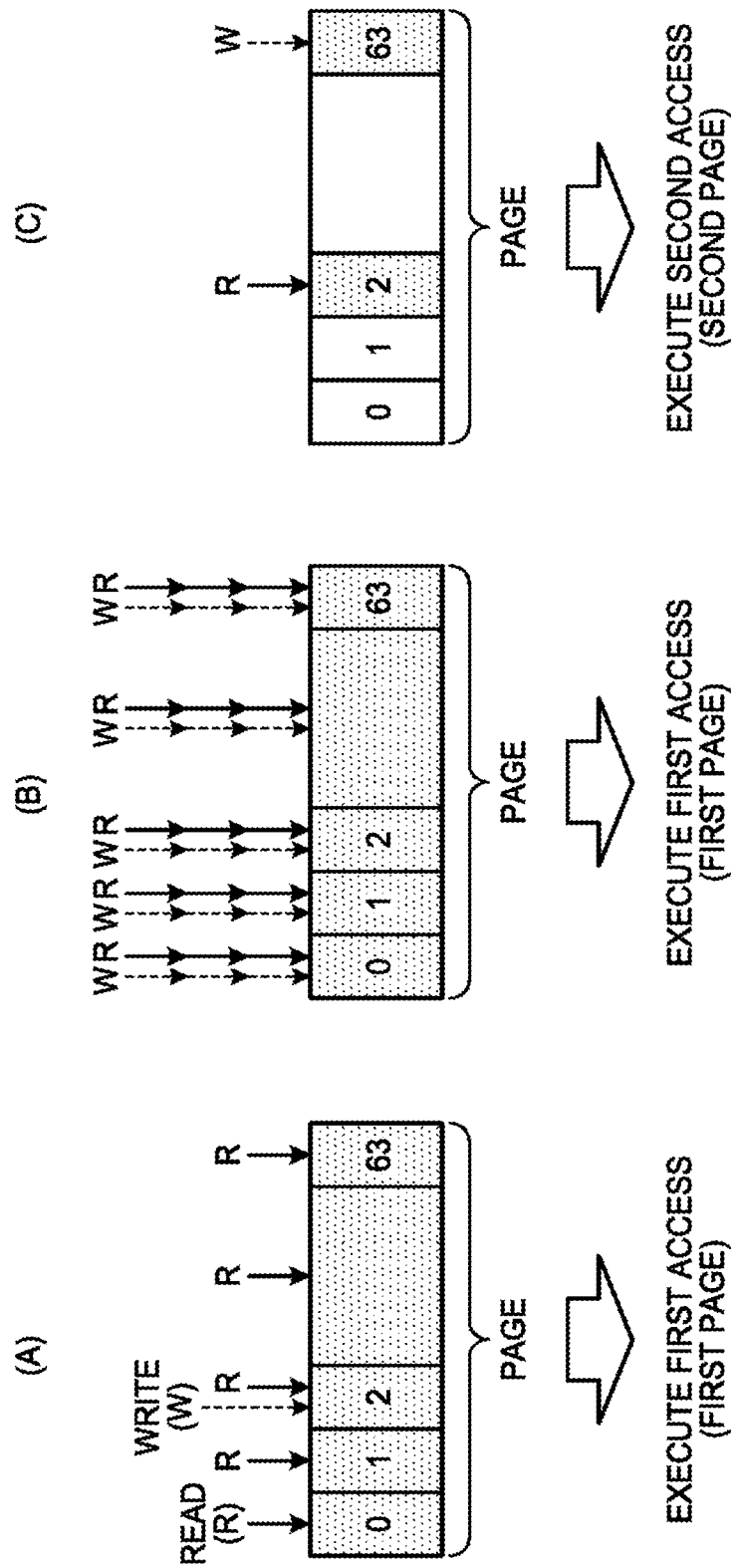
FIG. 14 is a diagram for explaining an operation example of the information processing apparatus of the fourth embodiment.

It is important to control the simultaneous writing to the first and second memories 20 and 30 so as to reduce the writing to the second memory 30 on that basis. This will be described by way of an example of FIG. 14. FIG. 14 exemplifies three patterns of access performed by the application. In (A) of FIG. 14, during the certain period shorter than the processing period, each of 64 pieces of page data included in any one of the pages included in the first data in the second memory 30 is read once, and writing is performed to only one of the 64 pieces of page data included in the page. That is, the number of times of reading is large, but the number of times of writing is small. In such a case, if the number of times of use of the page is equal to or larger than the threshold (such as "four times"), the page is accessed by execution of the first access (the page serves as the first page) so that the amount of access to the first memory 20 is increased relative to the amount of data transfer between the memories (amount of data transfer between the first and second memories 20 and 30). In (B) of FIG. 14, the reading and the writing are each performed three times from and to each of the 64 pieces of page data included in any one of the pages. That is, it is assumed that the numbers of times of reading and writing are both large and the page-out is performed once after access. In such a case, if the number of times of use of the page is equal to or larger than the threshold (such as "32 times"), the page is accessed by execution of the first access (the page serves as the first page) so that the amount of access to the first memory 20 is increased relative to the amount of data transfer between the memories. In (C) of FIG. 14, only one of the 64 pieces of the page data included in any one of the pages is read once, and writing is performed once to only one of the pieces of page data. That is, the numbers of times of reading and writing are both small. In such a case, the number of times of use of the page is smaller than threshold (such as "32 times"). Hence, the page is accessed by execution of the second access (the page serves as the second page) so that the amount of access to the first memory 20 is increased relative to the amount of data transfer between the memories. If, instead, the page is accessed by execution of the first access, one page is written to the second memory 30 when the page data is paged out after being transferred to the first memory 20 and updated by the processor 10. To avoid this, a page, such as the above-described page, to which the amount of writing is small is accessed by execution of the second access, so that the writing needs to be performed only once to only one piece of page data, and thus, power can be saved.

Figure 15:
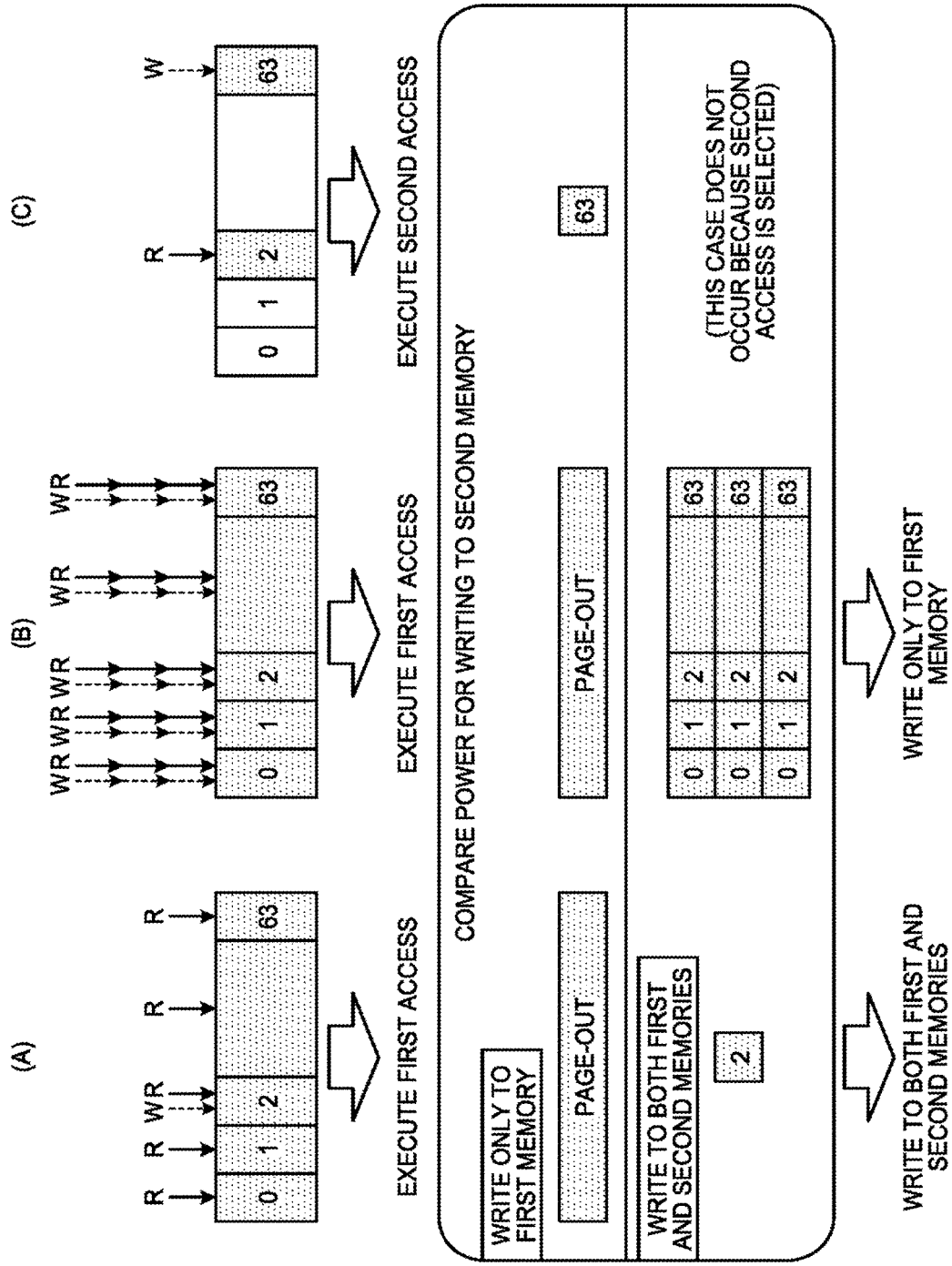
FIG. 15 is a diagram for explaining the operation example of the information processing apparatus of the fourth embodiment.

As describe above, cases are first classified into the case of executing the first access and the case of executing the second access. On that basis, the simultaneous writing to the first and second memories 20 and 30 is controlled so as to reduce the writing to the second memory 30 in the case of executing the first access. This will be described by way of an example of FIG. 15. In FIG. 15, (A) corresponding (A) of FIG. 14 and (B) corresponding (B) of FIG. 14 illustrate which is better between the case of writing data only to the first memory 20 and the case of writing the data to both the first and second memories 20 and 30.

First, in the case of (A), the pages requested to be written (target pages) are transferred to the first memory 20 and written only to the first memory 20 by execution of the first access. During this operation, writing is not performed to the second memory 30. However, it needs to be considered that the pages written to the first memory 20 are eventually moved out (paged out) to the second memory 30 by the swap processing. In the case of the page-out, all the pages need to be written to the second memory 30. A rectangle labeled "PAGE-OUT" illustrated in FIG. 15 represents an amount of power required for the page-out. In contrast, in the case of writing the data to both the first and second memories 20 and 30, the writing needs to be performed only to the page data "2" to be written among the pieces of page data included in the copy pages in the second memory 30. This is because of the following reason: although the target pages in the first memory 20 have been updated, the copy pages in the second memory 30 have also been simultaneously updated, and thereby the target pages in the first memory 20 need not be paged out (written back to the second memory 30), thus only needing to discard the target pages in the first memory 20. For the reason described above, the power consumption can be reduced by writing the data to both the first and second memories 20 and 30, in the case of (A).

In the case of (B), the target pages are transferred to the first memory 20 and written only to the first memory 20 by execution of the first access. During this operation, writing is not performed to the second memory 30, and the pages written to the first memory 20 are eventually moved out (paged out) to the second memory 30 by the swap processing. As a result, the writing to the second memory 30 is performed only when the page-out is performed. In contrast, in the case of writing the data to both the first and second memories 20 and 30, the page-out is not needed. However, every time the writing is performed, the second memory 30 is subjected to the writing. As a result, as illustrated in FIG. 15, the amount of writing to the second memory 30 is three times larger than that in the case of writing the data only to the first memory 20. For the reason described above, in the case of (B), the power consumption can be reduced by writing the data only to the first memory 20, and therefore, this alternative is selected.

That is, while having the same configuration as that of the embodiments described above, the controller 60 (access controller 111) performs, if the target pages representing the pages to be written to are the first pages, either first writing or second writing so that the amount of writing of data to the second memory 30 is smaller than the amount of writing of data when the target pages are written back (paged out) to the second memory 30 after being written by execution of the first access. The "first writing" refers to the following processing: after the movement processing is performed to move the target pages to the first memory 20, the data is written to the target pages moved to the first memory 20, the copy pages representing a copy of the target pages are left in the second memory 30, and the same data is also written to the copy pages in the second memory 30. The "second writing" refers to the following processing: after the movement processing is performed to move the target pages to the first memory 20, the data is written only to the target pages moved to the first memory 20 (the data is not written to the second memory 30).

As can be understood from the description above, it is also important to reduce the power required for the swap-out. This is particularly important for memories, such as a PCM, that consume relatively high power for rewriting. In such a case, particularly, the second memory 30 keeps a copy after data thereof is paged into the first memory 20; the data in the first memory 20 is read, and the writing is performed to the data in the first memory 20 and to the copy in the second memory 30; and, when the pages are paged out, the data in the first memory 20 is discarded without being copied to the second memory 30. That is, while having the same configuration as that of the embodiments described above, the controller 60 (access controller 111) performs, if reading target pages representing the pages to be read are the first pages, the movement processing to move the reading target pages in the second memory 30 to the first memory 20, and then reads data from the reading target pages moved to the first memory 20. If writing target pages representing the pages to be written to are the first pages, the controller 60 (access controller 111) performs the movement processing to move the writing target pages in the second memory 30 to the first memory 20, then writes data to the writing target pages moved to the first memory 20, leaves the copy pages representing the copy of the writing target pages in the second memory 30, and writes the same data to the copy pages in the second memory 30. When the writing target pages in the first memory 20 after being subjected to the writing are moved to the second memory 30, the controller 60 (access controller 111) discards the writing target pages after being subjected to the writing.

Assume a case where, in order to reduce the amount of writing of data to the second memory 30, the control is further performed in a mixed way between the case of writing the data to both the first and second memories 20 and 30 and the case of writing the data only to the first memory 20. In that case, the way of mixing may be changed depending on the power consumption characteristics of the NVM used, because the power consumption for writing varies among, for example, MRAMs and PCMs.

When the DRAM is employed as the main memory, the standby power is a problem. Hence, the power consumption can be reduced without reducing the required speed performance by dynamically adjusting the DRAM size in accordance with the application so as to reduce the DRAM size. When this method is combined with the present embodiment, the power consumption can be further reduced. As the method described above, for example, the following approach can be considered: for example, one or more effective regions represent regions of the first memory 20 to which first power required to read and write data is supplied; during a certain period in a period for performing the first processing to process the first data having a larger size than the effective regions, a swap processing overhead representing the processing amount of the swap processing is generated; and the control is performed to change the number of the effective regions so that the swap processing overhead becomes equal to or less than the threshold. As a result, the power can be saved while guaranteeing the speed performance of the application (speed performance of the processor 10). This method reduces the power consumption without reducing the required speed performance by reducing DRAM size in accordance with the application, and can be used also in combination with all embodiments other than the present embodiment.

In general, in many applications, the amount of writing is smaller than the amount of reading. Therefore, the writing may be simultaneously performed to all pages, without considering page by page to select the case of writing the data to both the first memory 20 (DRAM) and the second memory 30 (NVM) or the case of writing the data only to the first memory 20 so as to reduce the power consumption.

Assume a case where, in order to reduce the amount of writing of data to the second memory 30, the control is further performed in a mixed way between the case of writing the data to both the first memory 20 (DRAM) and the second memory 30 (NVM) and the case of writing the data only to the first memory 20. In that case, the upper limit of the number of rewriting depends on the type of a memory. Hence, the way of mixing may be changed depending on the upper limit of the number of rewriting of the memory, for example, in the following way: when the upper limit of the number of rewriting of the memory is low, the number of rewriting to both the first memory 20 (DRAM) and the second memory 30 (NVM) is reduced.

As described above, the present embodiment provides the three methods for updating (or storing) data. The first method is the method of executing the first access to write the data to the target pages transferred to the first memory 20, and writing back the target pages to which the data has been written to the second memory 30. The second method is the method executing the second access to directly write the data to the second memory 30. The third method is the method in which, as described above, when the pages to be written to (target pages) in the second memory 30 are the first pages, the movement processing is performed to move the target pages to the first memory 20, then the data is written to the target pages moved to the first memory 20, the copy pages representing the copy of the target pages are left in the second memory 30, and the same data is written to the copy pages in the second memory 30. The controller 60 can use any one of the three methods described above depending on the use and the situation. Specifically, any one of the three methods can be used, for example, to reduce processing time and/or power consumption. In the configuration of FIG. 7, when the data to be written is the data (persistent data) to be stored in the second memory 30 (nonvolatile memory), a completion of storage of the data (commit processing of the database application) refers to a completion of writing back of the target pages to which the data has been written to the second memory 30 in the case of the first method, a completion of direct writing of the data to the second memory 30 in the case of the second method, or a completion of writing of the same data to the copy pages in the second memory 30 (or a completion of discard of the same data in the first memory 20 thereafter) in the case of the third method. The controller 60 may have a function (high-speed commit function) to notify the external device of the completion after any of the completions.

Fifth Embodiment

The following describes a fifth embodiment. Description will be omitted for parts common to those of the first embodiment described above, where appropriate. In the embodiments described above, the OS or the controller 60 manages data based on a set data size, such as on a page-by-page basis, and transfers data (data having the management size) between the second memory 30 and the first memory 20. In contrast, in the present embodiment, the management is performed on the basis of per areas in which a plurality of pieces of data included in the first data are stored (per a plurality of memory areas corresponding one to one to a plurality of pieces of data). Each of the pieces of data (regardless of the page size) is assigned with an identifier (ID), and is managed based on the ID. The data managed based on the ID is constituted by a set of a data body and metadata representing characteristics of the data. That is, the OS or the controller 60 of the present embodiment can set the page table described above based on table information, such as that illustrated in FIG. 16, that associates memory area information indicating, for each of the IDs corresponding one to one to the pieces of data included in the first data, the location of a memory area storing the data body with the metadata describing at least whether to perform the first access or the second access to perform reading or writing.

Figure 16:
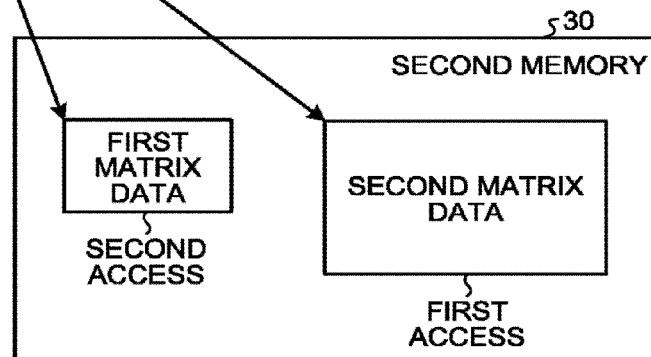
FIG. 16 is a diagram illustrating an example of table information according to a fifth embodiment.

The table information illustrated in FIG. 16 can be considered to correspond to the second correspondence information that associates identification information (corresponding to the metadata) that can identify whether to perform the first access or the second access to perform reading or writing with each of the pieces of data included in the first data. The access controller 111 (the OS or the controller 60) may be considered to set the page table described above based on the second correspondence information described above. The second correspondence information described above may be considered to be an example of the hint information described above.

A plurality of pieces of the metadata may be attached to the corresponding data. The memory area information of FIG. 16 is information indicating the location of the memory area storing the data body in the second memory 30, and is, for example, a set of a first address and a size. The application sets (attaches) the metadata when the data is stored or allocated in the second memory 30. FIG. 16 illustrates first matrix data and second matrix data, each being data in a matrix form. The metadata of the first matrix data includes metadata indicating to perform the second access for reading or writing. The metadata of the second matrix data includes metadata indicating to perform the first access for reading or writing.

Another piece of metadata (second metadata) may be stored that indicates from which area (first area) in the area storing the corresponding data (area indicated by the memory area information) the data is to start to be accessed. In that case, if the metadata indicating to perform the first access for reading or writing is included as first metadata, the OS can start the swap processing to transfer the data in the first area to the first memory 20 at any time before the application starts actual access to the corresponding data, such as at the time when the application specifies the ID. If the metadata indicating to perform the second access for reading or writing is included as first metadata, the OS can load the data in the first area in advance into the last level cache included in the processor 10. Transferring the data in advance in this manner allows the first processing to be performed still faster and with still less power consumption.

When the application uses the first matrix data and the second matrix data on the second memory 30 (NVM), the OS uses the metadata that has been set as the hint information described above. That is, the OS determines, based on the information in the metadata, whether to perform the first access or the second access to access each of the pieces of data included in the first data. If the first access is determined to be executed for the access, the OS sets the access information indicating to execute the first access in the page table. If the second access is determined to be executed for the access, the OS sets the access information indicating to execute the second access in the page table. The metadata has, for example, a configuration given in any of the modifications of the first example, but may have any other configuration. The configuration described above is applicable to the information processing apparatus 1 having the virtual memory of the OS, to the memory module 50, and to the other embodiments.

Sixth Embodiment

Figure 17:
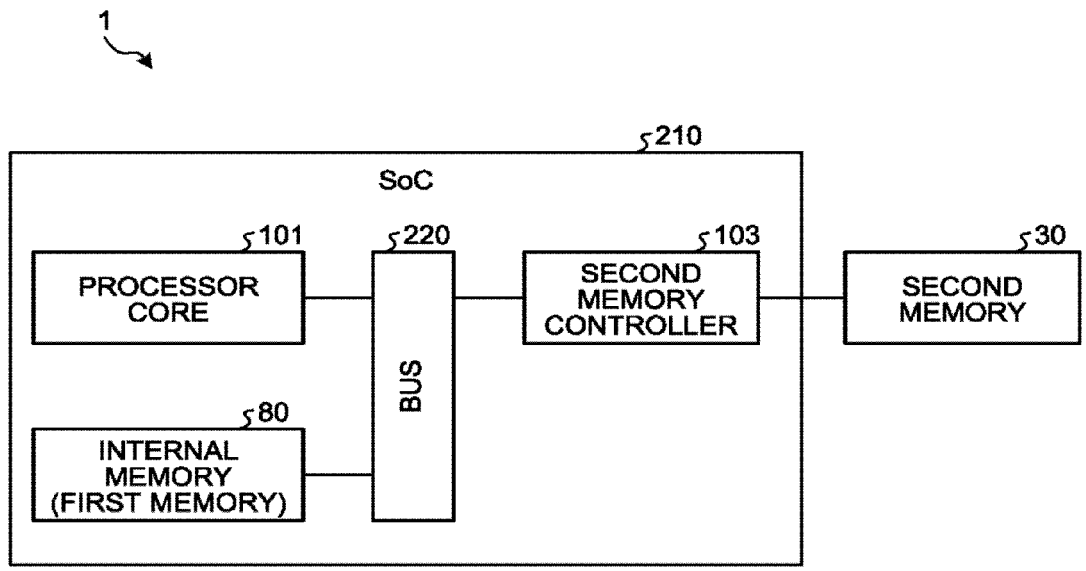
FIG. 17 is a diagram illustrating an exemplary configuration of an information processing apparatus according to a sixth embodiment.

The following describes a sixth embodiment. Description will be omitted for parts common to those of the first embodiment described above, where appropriate. In the present embodiment, the first memory 20 described above is constituted by an internal memory representing a memory in the processor 10 (or the controller 60). The specific details will be described below. FIG. 17 is a diagram illustrating an exemplary hardware configuration of the information processing apparatus 1 of the present embodiment. As illustrated in FIG. 17, the information processing apparatus 1 includes a system on chip (SoC) 210 and the second memory 30 constituted by, for example, an NVM. The SoC 210 includes, as internal modules, a processor core 101, an internal memory 80 serving as the first memory 20 (serving as the main memory), and the second memory controller 103. These internal modules are connected together through a bus 220. In this example, the SoC 210 corresponds to the "processing device". Instead of being connected with the DRAM as the main memory, the SoC 210 uses the memory (internal memory 80) in the SoC 210 that is faster than the DRAM, and thereby can perform the swap processing faster.

In this example, the processor core 101 is, for example, an ARM processor, and includes, for example, cache memories (L1 cache and L2 cache) and a general-purpose single-instruction multiple data engine, such as NEON. The SoC 210 may have a single-core configuration having one processor core 101, or may have a multi-core configuration (may be a multi-core processor) having a plurality of processor cores.

The internal memory 80 is constituted by, for example, a static random access memory (SRAM), but is not limited to this, and may be, for example, a high-speed nonvolatile memory such as an MRAM. The internal memory 80 is an on-chip memory, and hence can have a lower latency and smaller power consumption in accessing than the memories (first and second memories 20 and 30) connected to the SoC 210.

The information processing apparatus 1 may have such a DRAM-less system configuration without having a DRAM, from the viewpoints of, for example, an advantage that the standby power can be reduced from the large value of the DRAM and an advantage that the number of components required for the information processing apparatus 1 can be reduced by not having the DRAM. Also in such a system, the methods described above can be implemented by using the internal memory 80 illustrated in FIG. 17 as the first memory 20 described above.

To sum up, the information processing apparatus 1 includes the processing device (the SoC 210, in this example) that executes the first processing to process the first data constituted by a plurality of pages, the internal memory 80, and the second memory 30 that has an access latency of reading and writing of data higher than that of the internal memory 80, and stores the first data, and the pages included in the first data include the first pages that are each read or written a number of times equal to or more than the threshold and the second pages that are each read or written a number of times less than the threshold in the certain period shorter than the processing period for executing the first processing. The processing device may have a configuration including the access controller 111 that executes, when the pages to be read from or written to are the first pages, the first access to perform the movement processing to move the pages to the internal memory 80, and then to read or write the pages moved to internal memory 80, or executes, when the pages to be read from or written to are the second pages, the second access of directly reading or writing the data from or to the second memory 30.

From another point of view, it can be considered that the access controller 111 described above may be configured as follows: when reading or writing the first data, the access controller 111 performs the first access and the second access of directly reading or writing the data from or to the second memory 30 so that the ratio of the amount of reading or writing of data from or to the internal memory 80 performed by the external device 40 (processing device) is larger than the ratio obtained when the whole first data is read or written by execution of the first access, relative to the amount of data transfer between the internal memory 80 and the second memory 30 that occurs along with the first access of reading or writing the pages moved into the internal memory 80 after the execution of the movement processing of moving the pages in the second memory 30 to the internal memory 80.

The internal memory 80 generally has a smaller capacity than that of, for example, the main memory constituted by the DRAM. In this case, basically, the access controller 111 executes, when the pages to be read from or written to are the first pages, the first access to perform the movement processing to move the pages to the internal memory 80, and then to read or write the pages moved to internal memory 80, or executes, when the pages to be read from or written to are the second pages, the second access of directly reading or writing the data from or to the second memory 30. If, however, the internal memory 80 is too small, and thereby, the amount of data transfer in a predetermined period between the internal memory 80 and the second memory 30 exceeds a predetermined value, the processing time and the power consumption are increased by the increase in the amount of data transfer. In that case, the access controller 111 treats some of the pages, of which the first pages are to be read or written, as second pages even if being first pages, and performs the second access of directly reading or writing the data from or to the second memory 30. Doing this can restrain a large increase in the processing time and the power consumption. Since the internal memory 80 has a small size, the amount of data transfer described above can be reduced by observing the amount of data transfer between the internal memory 80 and the second memory 30, and increasing the pages subjected to the second access. A method may be used in which the pages subjected to the second access are increased by one, the amount of data transfer is compared with the predetermined value, and these operations are repeated until the amount of data transfer is reduced to be smaller than the predetermined value. This method is not limited to the case where the first memory is the internal memory, but is naturally applicable in the same manner to the examples described above.

To sum up, if the amount of data transfer between the first memory 20 (including the internal memory 80) and the second memory 30 that is generated along with the movement processing describe above is larger than the predetermined value, the access controller 111 can perform the second access until the amount of data transfer is reduced to be smaller than the predetermined value regardless of whether the pages to be read from or written to are the first pages.

It can be considered that the access controller 111 described above may be configured as follows: when reading or writing the first data, the access controller 111 performs the first access and the second access of directly reading or writing the data from or to the second memory 30 so that the sum of the power consumption of the internal memory 80 and the power consumption of the second memory 30 is smaller than the power consumption generated when the whole first data in the second memory 30 is read or written by execution of the first access of reading or writing the pages moved into the internal memory 80 after the execution of the movement processing of moving the pages included in the first data in the second memory 30 to the internal memory 80.

The configuration of the present embodiment is applicable to the information processing apparatus 1 having the virtual memory of the OS, to the memory module 50, and to the other embodiments.

In addition, it may be configured such that the program executed by the information processing apparatus according to the respective embodiments and modified examples described above is stored in a computer connected to the network such as the Internet and is provided through download via the network. In addition, it may be configured such that the program executed by the information processing apparatus according to the respective embodiments and modified examples described above is provided or distributed via the network such as the Internet. In addition, it may be configured such that the program executed by the information processing apparatus according to the respective embodiments and modified examples described above is provided in the state of being incorporated in a computer-readable recording medium, which may be provided as a computer program product, such as a hard disk drive, a CD-ROM, a DVD, and a semiconductor memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a processing device configured to execute an application using first data;
a first memory; and
a second memory configured to store the first data, the second memory having an access latency of reading and writing of data higher than that of the first memory, wherein
the first data includes a first page and a second page, the first page being read or written a number of times equal to or more than a threshold in a certain period that is shorter than a processing period for executing the application, the second page being read or written a number of times less than the threshold in the certain period,
the processing device includes an operating system configured to receive a request to read or write a page included in the first data from the application and configured to perform control according to the received request, and
the operating system is configured to
execute first access of performing movement processing to move the first page to the first memory and then reading or writing data from or to the first page moved to the first memory, and
execute second access of directly reading or writing data from or to the second page of the second memory.

2. The apparatus according to claim 1, wherein the operating system is configured to determine whether a page to be read from or written to is the first page or the second page based on correspondence information that associates each of a plurality of pages with access information indicating whether to execute the first access or the second access to perform reading or writing.

3. The apparatus according to claim 2, wherein the operating system is configured to receive, from an application corresponding to the application, hint information that specifies determination information for determining, for each piece of data having a predetermined size included in the first data, whether to perform the first access or the second access to read or write the piece of data, and is configured to set the correspondence information based on the received hint information.

4. The apparatus according to claim 3, wherein
the determination information is information indicating whether the data is randomly accessed data, and
the operating system is configured to set the access information indicating that the second access is to be executed to read from or write to one or more pages corresponding to the data having the predetermined size that is specified to be the randomly accessed data by the determination information.

5. The apparatus according to claim 3, wherein
the second memory is a nonvolatile memory,
the determination information is information indicating whether the data is persistent data representing data to be kept in the second memory, and
the operating system is configured to set the access information indicating that the second access is to be executed to read from or write to one or more pages corresponding to the data having the predetermined size that is specified to be persistent data by the determination information.

6. The apparatus according to claim 3, wherein
the determination information is information indicating an access frequency of the data, and
the operating system is configured to set the access information indicating that the second access is to be executed to read from or write to one or more pages corresponding to the data having the predetermined size that is specified by the determination information that the access frequency is lower than a reference value.

7. The apparatus according to claim 3, wherein
the determination information includes information indicating that each piece of the data having the predetermined size is to be accessed after the determination information is received from the application, and
the operating system is configured to
start, when the data having the predetermined size corresponds to one or more pages associated with the access information indicating that the first access is to be executed to perform reading or writing, processing to transfer the page or pages corresponding to the data to the first memory before the application starts accessing the data, and
start, when the data having the predetermined size corresponds to the page or pages associated with the access information indicating that the second access is to be executed to perform reading or writing, processing to transfer one or more cache lines corresponding to the data to a cache memory included in the processing device before the application starts accessing the data.

8. The apparatus according to claim 2, wherein a size of a page associated with the access information indicating that the second access is to be executed to perform reading or writing is larger than a size of a page associated with the access information indicating that the first access is to be executed to perform reading or writing.

9. The apparatus according to claim 2, wherein the operating system is configured to set the correspondence information based on second correspondence information that associates identification information capable of identifying whether to execute the first access or the second access to perform reading or writing with each of a plurality of pieces of data included in the first data.

10. The apparatus according to claim 1, wherein
the operating system is configured to
set all pages included in the first data as the second pages during a first period in the processing period, and
switch the second pages to the first pages based on a state of reading or writing of the data from or to the second memory during the first period.

11. The apparatus according to claim 1, wherein
the second memory is a nonvolatile memory, and
the operating system is configured to perform, when a page to be written to is the first page, the movement processing to move the page to the first memory, and then write data to the page moved to the first memory, leave a copy page representing a copy of the page in the second memory, and write the same data to the copy page in the second memory.

12. The apparatus according to claim 1, wherein the operating system is configured to perform, when a target page representing a page to be written to is the first page, either first writing or second writing so that an amount of writing of data to the second memory is smaller than the amount of writing of data when the target page is written back to the second memory after being written by execution of the first access, the first writing being such that, after the movement processing is performed to move the target page to the first memory, the data is written to the target page moved to the first memory, a copy page representing a copy of the target page is left in the second memory, and the same data is written to the copy page in the second memory, the second writing being such that, after the movement processing is performed to move the target page to the first memory, the data is written only to the target page moved to the first memory.

13. The apparatus according to claim 1, wherein the first memory is an internal memory representing a memory in the processing device.

14. The apparatus according to claim 13, wherein the operating system is configured to execute the second access, when an amount of data transfer between the first memory and the second memory that is generated along with the movement processing is larger than a predetermined value, until the amount of data transfer is reduced to be smaller than the predetermined value regardless of whether a page to be read from or written to is the first page.

15. A storage device comprising:
a controller configured to control reading and writing of data performed by a processing device that is configured to execute an application using first data;
a first memory; and
a second memory configured to store the first data, the second memory having an access latency of reading and writing of data higher than that of the first memory, wherein
the first data includes a first page and a second page, the first page being read or written a number of times equal to or more than a threshold in a certain period that is shorter than a processing period for executing the application, the second page being read or written a number of times less than the threshold in the certain period,
the controller includes an operating system configured to receive a request to read or write a page included in the first data from the application and configured to perform control according to the received request, and
the operating system is configured to execute first access of performing movement processing to move the first page to the first memory and then reading or writing data from or to the first page moved to the first memory, and execute second access of directly reading or writing data from or to the second page of the second memory.

16. A computer program product comprising a non-transitory computer-readable medium containing a program, wherein when executed by a computer that includes a processing device configured to execute an application using first data, a first memory, and a second memory configured to store the first data the second memory having an access latency of reading and writing of data higher than that of the first memory, the first data including a first page and a second page, the first page being read or written a number of times equal to or more than a threshold in a certain period that is shorter than a processing period for executing the application, the second page being read or written a number of times less than the threshold in the certain period, the program causes the computer to execute:

receiving a request to read or write a page included in the first data from the application and performing control according to the received request, wherein the performing control includes:

executing first access of performing movement processing to move the first page to the first memory and then reading or writing data from or to the first page moved to the first memory; and executing second access of directly reading or writing data from or to the second page of the second memory.

17. An information processing apparatus comprising:

a processing device configured to execute an application using first data that includes a plurality of pages;

a first memory; and a second memory configured to store the first data, the second memory having an access latency of reading and writing of data higher than that of the first memory, wherein the processing device includes an operating system configured to receive a request to read or write a page included in the first data from the application and configured to perform control according to the received request, and the operating system is configured to execute, in reading or writing the first data, both first access of performing movement processing to move a page included in the first data in the second memory to the first memory and then reading or writing data from or to the page moved to the first memory and second access of directly reading or writing data from or to the second memory so that a ratio of an amount of data read from or written to the page moved to the first memory relative to an amount of data transfer between the first memory and the second memory that occurs along with the first access is larger than a ratio of an amount of data read from or written to the page moved to the first memory relative to an amount of data transfer between the first memory and the second memory that occurs when the whole first data is read or written by execution of the first access.

18. An information processing apparatus comprising:

a processing device configured to execute an application using first data that includes a plurality of pages;

a first memory; and a second memory configured to store the first data, the second memory having an access latency of reading and writing of data higher than that of the first memory, wherein the processing device includes an operating system configured to receive a request to read or write a page included in the first data from the application and configured to perform control according to the received request, and the operating system is configured to execute, in reading or writing the first data, both first access of performing movement processing to move a page included in the first data in the second memory to the first memory and then reading or writing data from or to the page moved to the first memory and second access of directly reading or writing data from or to the second memory so that a sum of a power consumption of the first memory and a power consumption of the second memory is smaller than a sum of a power consumption of the first memory and a power consumption of the second memory generated when the whole first data in the second memory is read or written by execution of the first access.

* * * * *